United States Patent [19]
Pittet et al.

[11] Patent Number: 5,474,030
[45] Date of Patent: Dec. 12, 1995

[54] METHOD AND APPARATUS FOR DETERMINING EXCITANTS AND ATTRACTANTS FOR THE PENAEUS GENUS OF CRUSTACEA

[75] Inventors: Alan O. Pittet, Atlantic Highlands, N.J.; Phillip G. Lee; Jennifer C. Ellis, both of Galveston, Tex.

[73] Assignees: International Flavors & Fragrances Inc., New York, N.Y.; The University of Texas System, Austin, Tex.

[21] Appl. No.: 279,181

[22] Filed: Jul. 22, 1994

[51] Int. Cl.[6] ............................ A01K 61/00; A01K 63/00
[52] U.S. Cl. ........................ 119/207; 119/212; 119/247; 119/210
[58] Field of Search ........................... 119/204, 205, 119/212, 245, 247, 267, 210; 424/84; 434/295, 296, 297

[56] References Cited

U.S. PATENT DOCUMENTS

| | | | |
|---|---|---|---|
| 3,903,260 | 9/1975 | Beigler et al. | 424/84 |
| 3,993,746 | 11/1976 | Beigler et al. | 424/78 |
| 4,249,480 | 2/1981 | Dugan et al. | |
| 4,250,835 | 2/1981 | Dugan et al. | |

(List continued on next page.)

FOREIGN PATENT DOCUMENTS 27231  2/1991  Japan.

OTHER PUBLICATIONS

Nakajima, Chemical Abstracts vol. 115:113303n, "Fish Feeds Containing Feeding Stimulants And Gels and Their Preparation". Feb. 1991.

(List continued on next page.)

*Primary Examiner*—Todd E. Manahan
*Attorney, Agent, or Firm*—Arthur L. Liberman

[57] ABSTRACT

Described is a process for determining excitants and attractants for members of the Penaeus genus of Crustacea including but not limited to *Penaeus setiferus* and *Penaeus vannamei*, as well as apparatus for carrying out such process. The apparatus for carrying out the process includes "static" tank apparatus, "flow through" tank apparatus and "Y-maze" apparatus, each equipped with a camera device and each taken alone or in combination with one another. Also described is a method for exciting and/or attracting members of the Penaeus genus of Crustacea including but not limited to *Penaeus setiferus* and *Penaeus vannamei* using various solutions of molecules including but not limited to N-acetyl-alpha-D-Glucosamine which is a mixture of isomers having the structures:

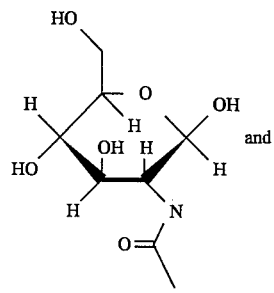

and

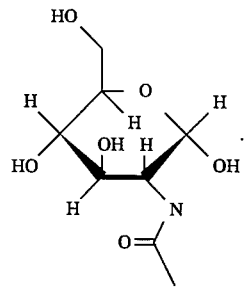

13 Claims, 32 Drawing Sheets

U.S. PATENT DOCUMENTS

| | | | |
|---|---|---|---|
| 4,320,150 | 3/1982 | Austin et al. | 426/2 |
| 4,593,647 | 6/1986 | Sorgeloos et al. | 119/205 |
| 4,752,480 | 6/1988 | Charbonnier et al. | 426/1 |
| 4,828,829 | 5/1989 | Bethshears | 424/84 |
| 5,073,115 | 12/1991 | Howell | 434/297 |
| 5,133,959 | 7/1992 | Kumins | 424/84 |
| 5,222,458 | 6/1993 | Pippy | 119/247 |
| 5,277,918 | 1/1994 | Rawlins | 426/1 |

OTHER PUBLICATIONS

Castilla and Crisp, J.Mar.Biol.Ass.U.K. (1970) 50, 829–847, "Responses of *Asterias Rubens* to Olfactory Stimuli".

Shelton and Mackie, J.Ex.Mar.Biol.Ecol., 1971, vol. 7, pp. 41–49, "Studies On The Chemical Preferences of The Shore Crab", *Carcinus Maenas*(L.).

McLeese, Journal Fisheries Research Board of Canada, vol. 27, No. 8, 1970, pp. 1371–1378, "Detection of Dissolved Substances by the American Lobster (*Homarus americanus*) and Olfactory Attraction between Lobsters".

Holland and Borski, Aquaculture, 109 (1993), pp. 153–164, "A palatability bioassay for determining ingestive stimuli in the marine shrimp *Penaeus vannamei*".

Lee, J.Exp.Mar.Biol.Ecol., 153 (1992), pp. 53–67, "Chemotaxis by *Octopus maya* Voss et Solis in a Y–maze".

Chase and Wells, J.Comp.Physiol.A (1986), vol. 158, pp. 375–381, "Chemotactic behaviour in Octopus".

Benfield and Aldrich, Contributions in Marine Science, (1991), vol. 32, pp. 78–88, "A Laminar–Flow Choice Chamber For Testing The Responses Of Postlarval Penaeids To Olfactants".

Lombardo, et al, Comp.Biochem.Physiol., vol. 101C, No. 2, pp. 389–398, 1992, "Amino Acids And Derivatives As Food–Finding Signals In The Freshwater Snail *Planorbarius Corneus* (L.)".

Steele, et al, J.Fish.Biol. (1990), 36, pp. 341–352, "Attraction of Zebrafish, *Brachydanio rerio*, to alanine and its suppression by Copper".

Lisowski, et al, The Progressive Fish–Culturist, vol. 48, 1986, pp. 64–67, "A Two–Choice Water Recirculation Tank for Assessing Chemosensory Preferences of Landlocked Seal Lampreys".

Brown and Rittschof, Mar.Behav.Physiol, 1984, vol. 11, pp. 75–93, "Effects of Flow and Concentration of Attractant on Newly Hatched Oyster Drills, *Urosalpinx cinerea* (Say)".

Sloan and Northway, Journal of Experimental Marine and Ecology, (1982), vol. 61, pp. 85–98, "Chemoreception by the Asteroid *Crossaster Papposus* (L.)".

Mackie and Shelton, Marine Biology, 14, 217–221 (1972), "A whole –animal bioassay for the determination of the food attractants of the lobster, *Homarus gammarus*".

Adams and Johnsen, The Progressive Fish Culturist, vol. 48, pp. 147–149, 1986, "A Solid Matrix Bioassay for Determining Chemical Feeding Stimulants".

Doving and Schieldrop, Chemical Senses and Flavor, vol. I, (1975), pp. 371–374, "An Apparatus Based on Turbulent Mixing For Delivery of Odorous Stimuli".

Bonsdorff and Vahl, Mar.Behav.Physiol., 1982, vol. 8, pp. 243–248, "Food preference of the sea urchins *Echinus acutus* and *E. esculentus*".

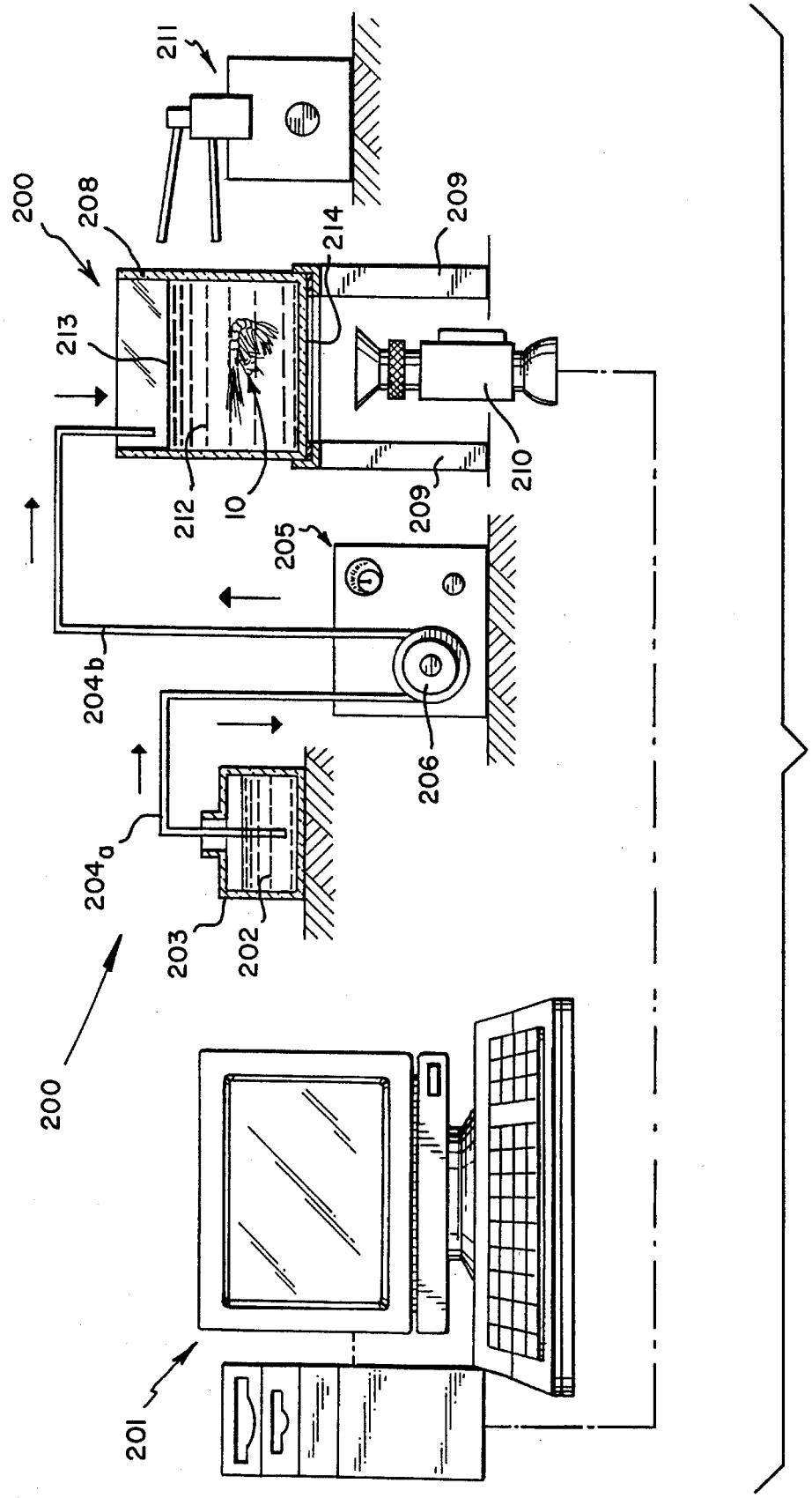

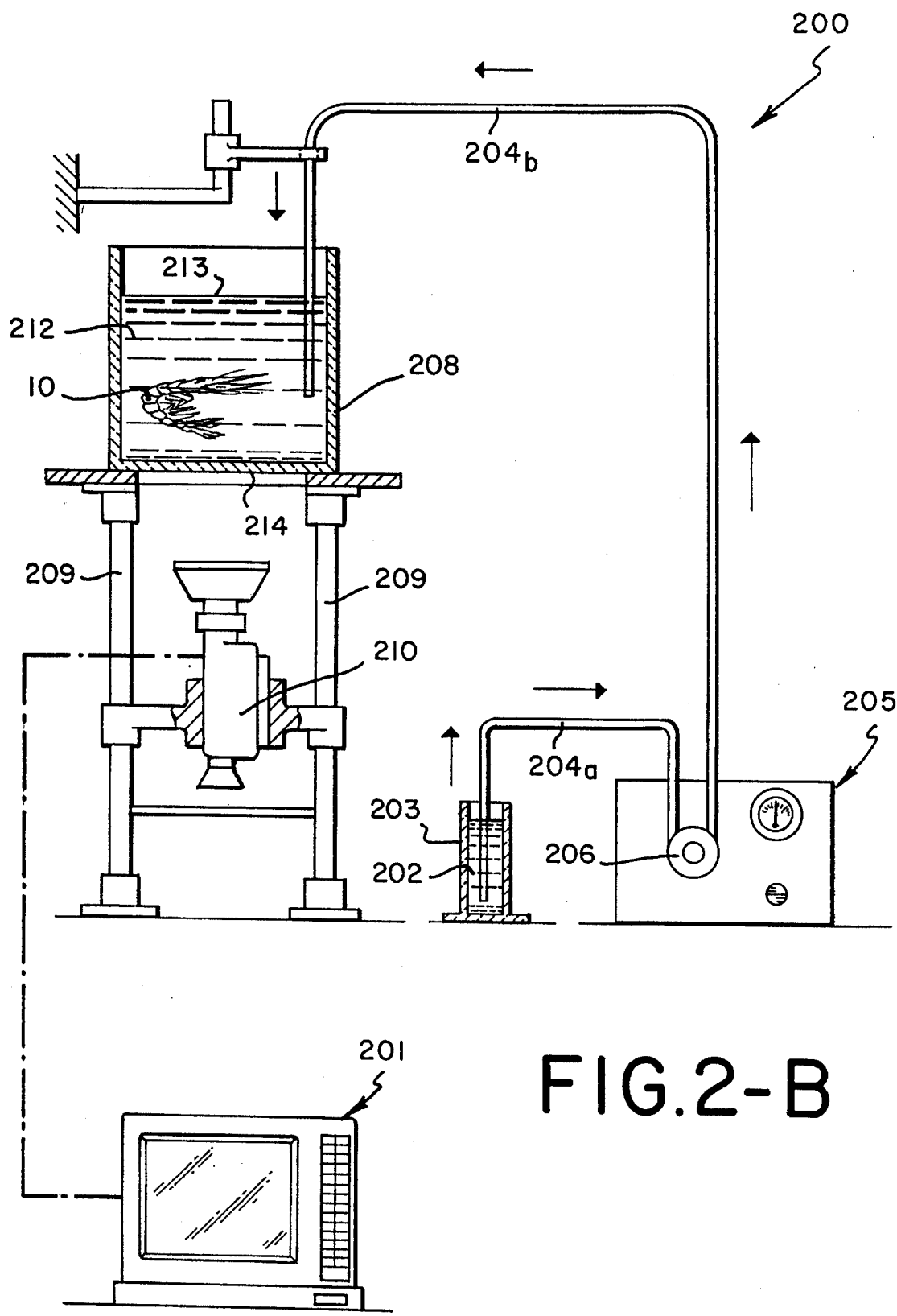
FIG.2-B

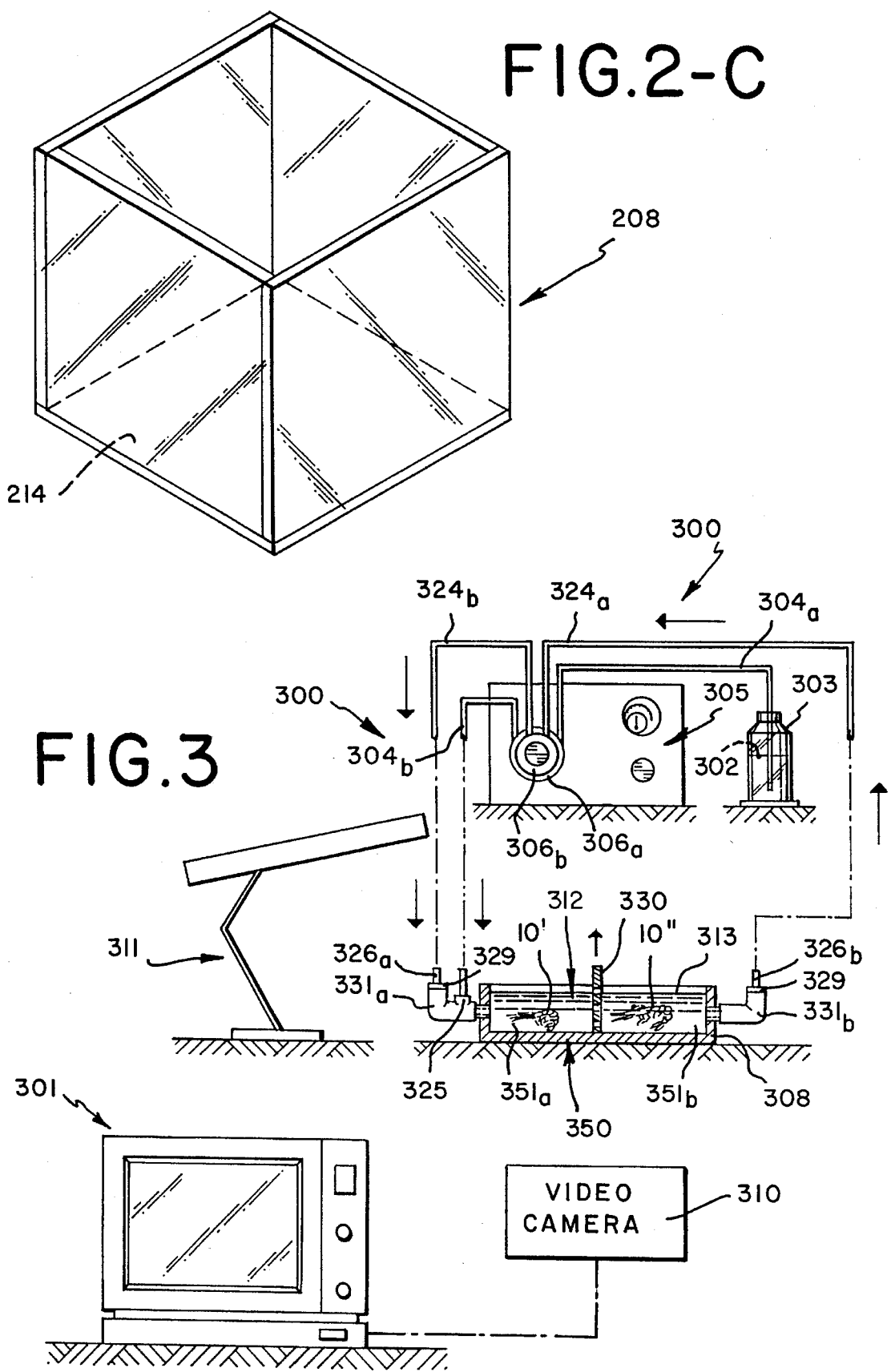

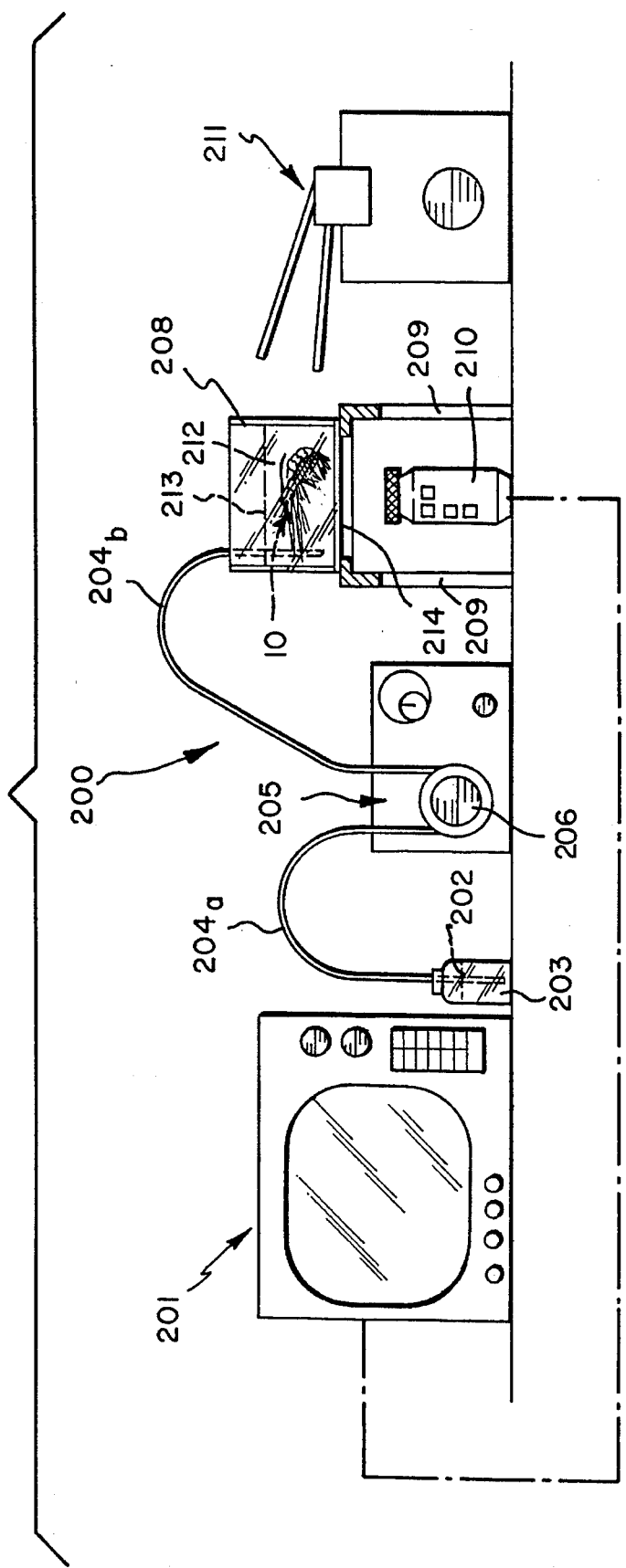

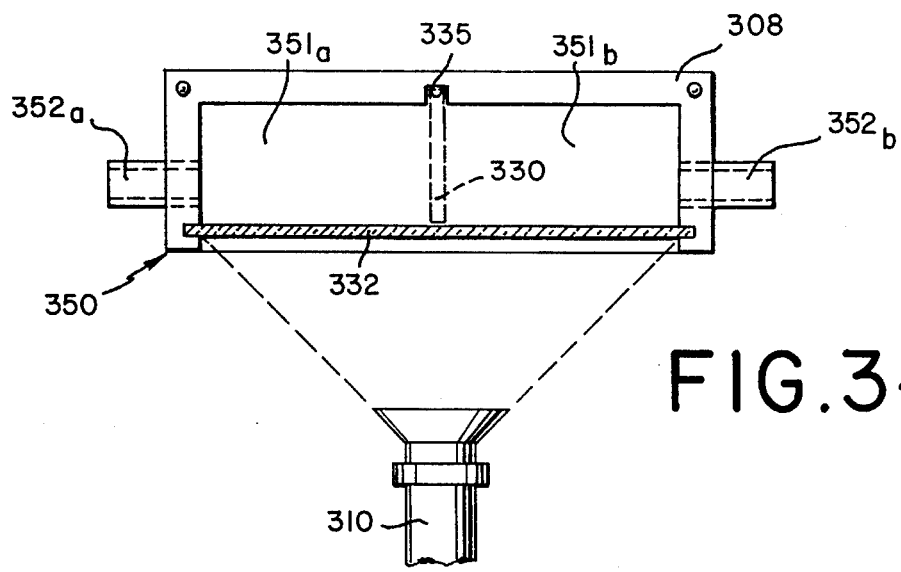
FIG.3-A
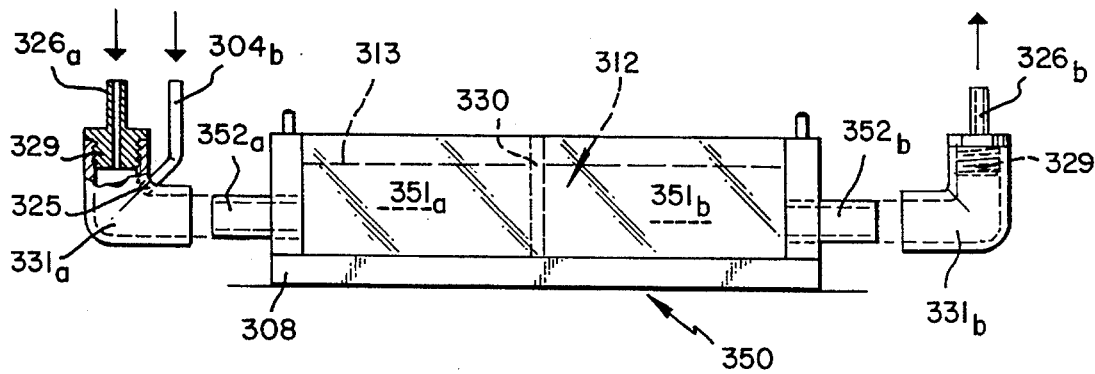
FIG.3-B
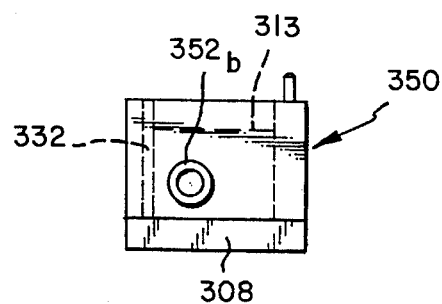
FIG.3-C

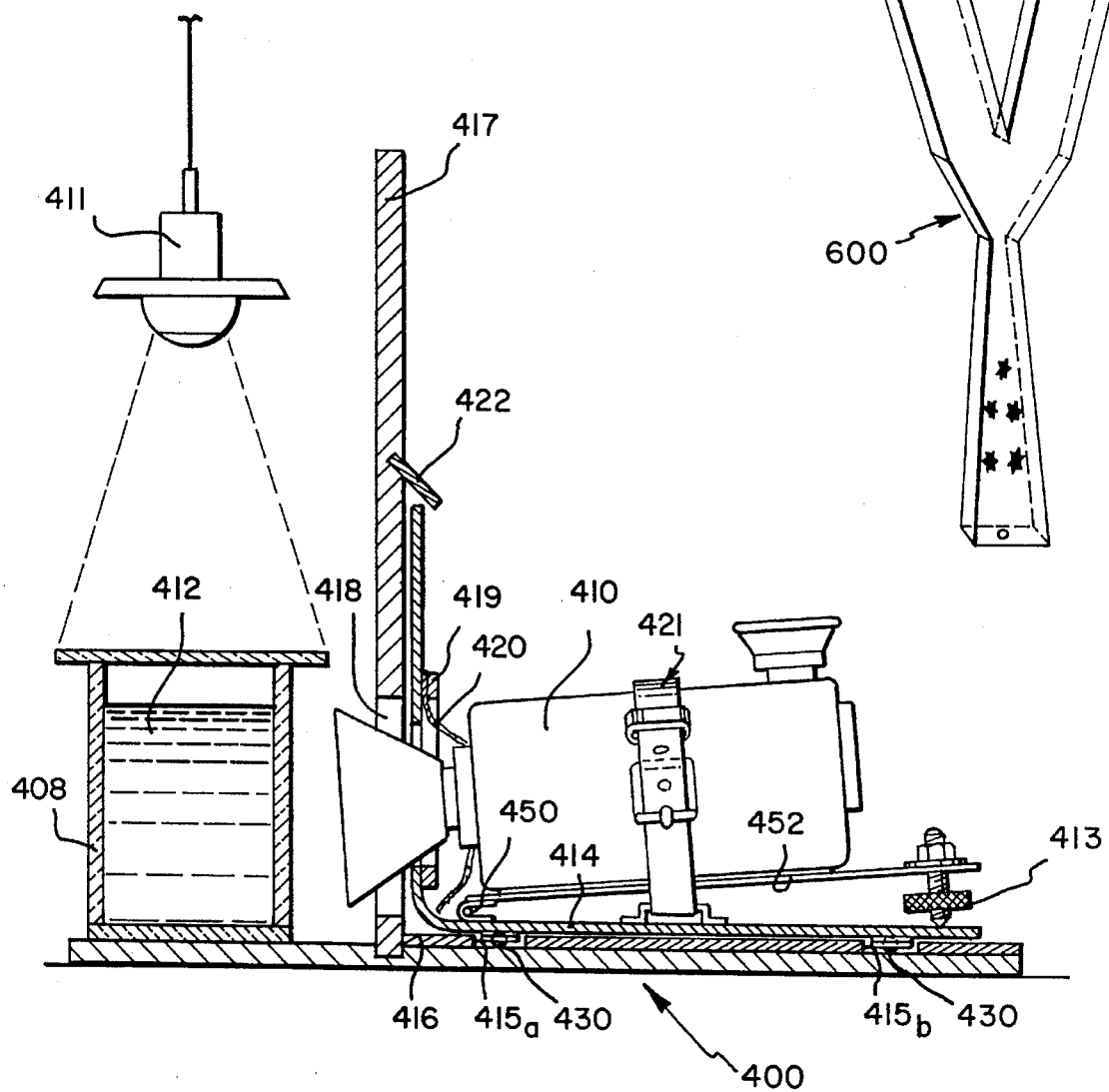

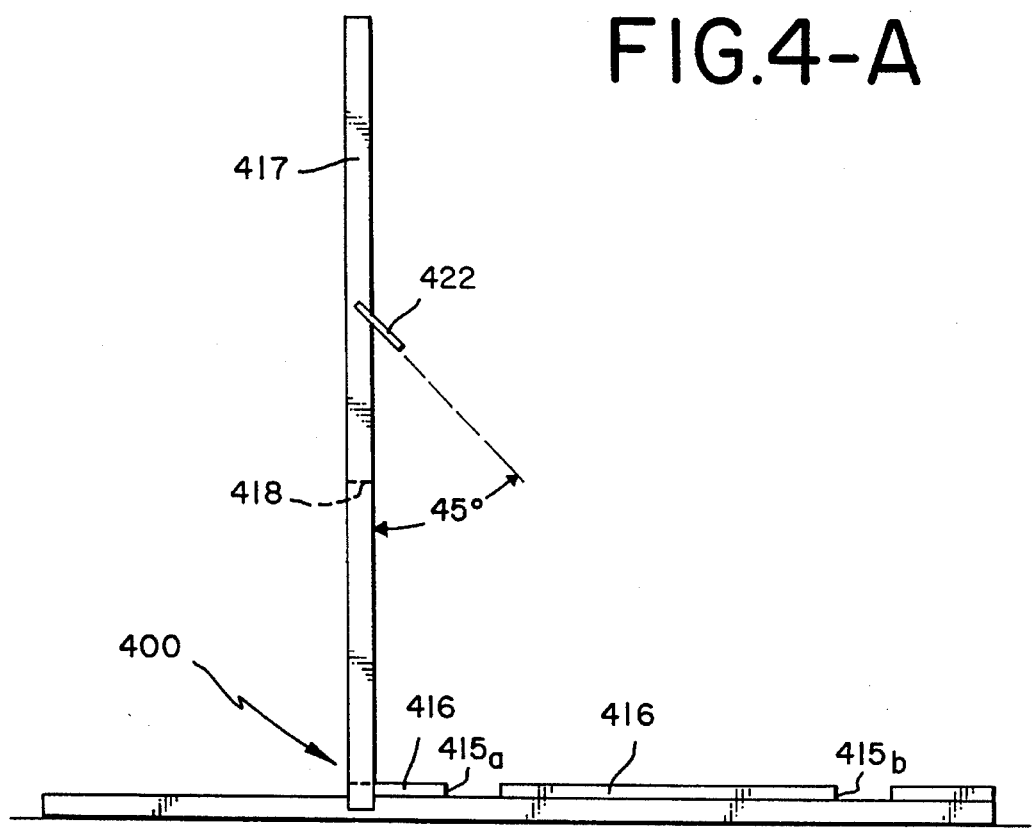
FIG.4-A
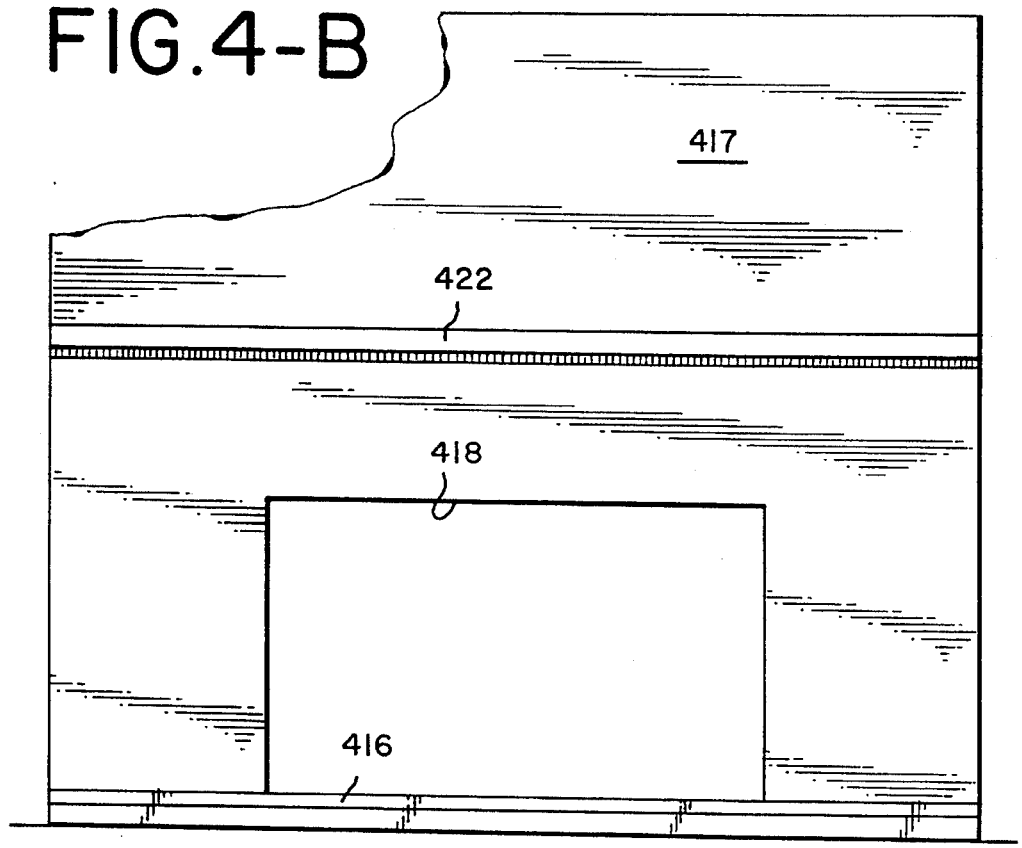
FIG.4-B

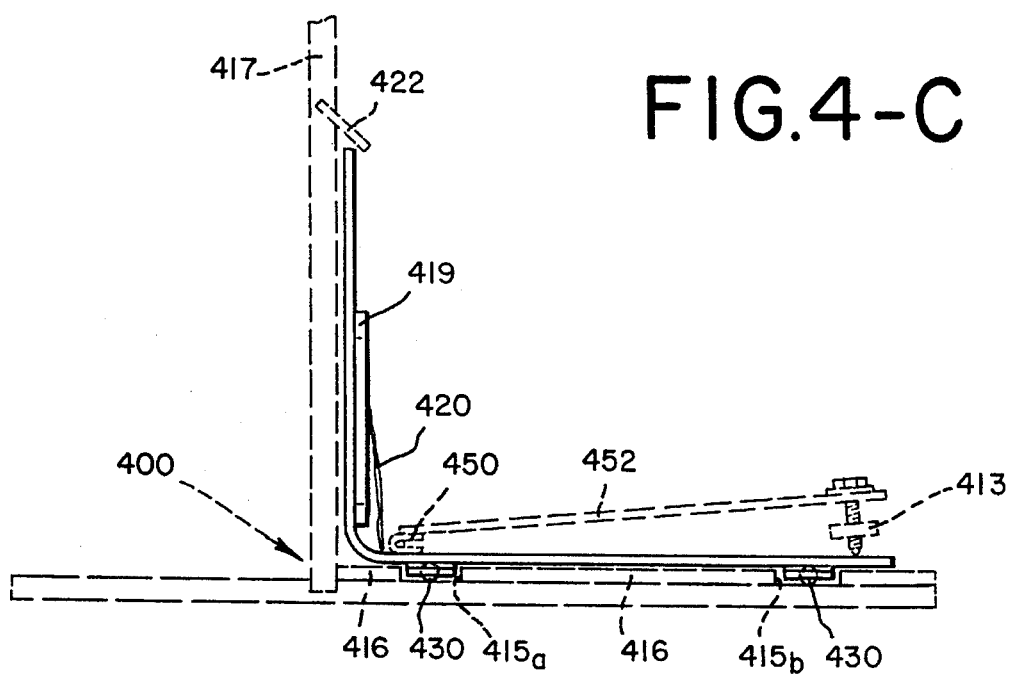
FIG.4-C
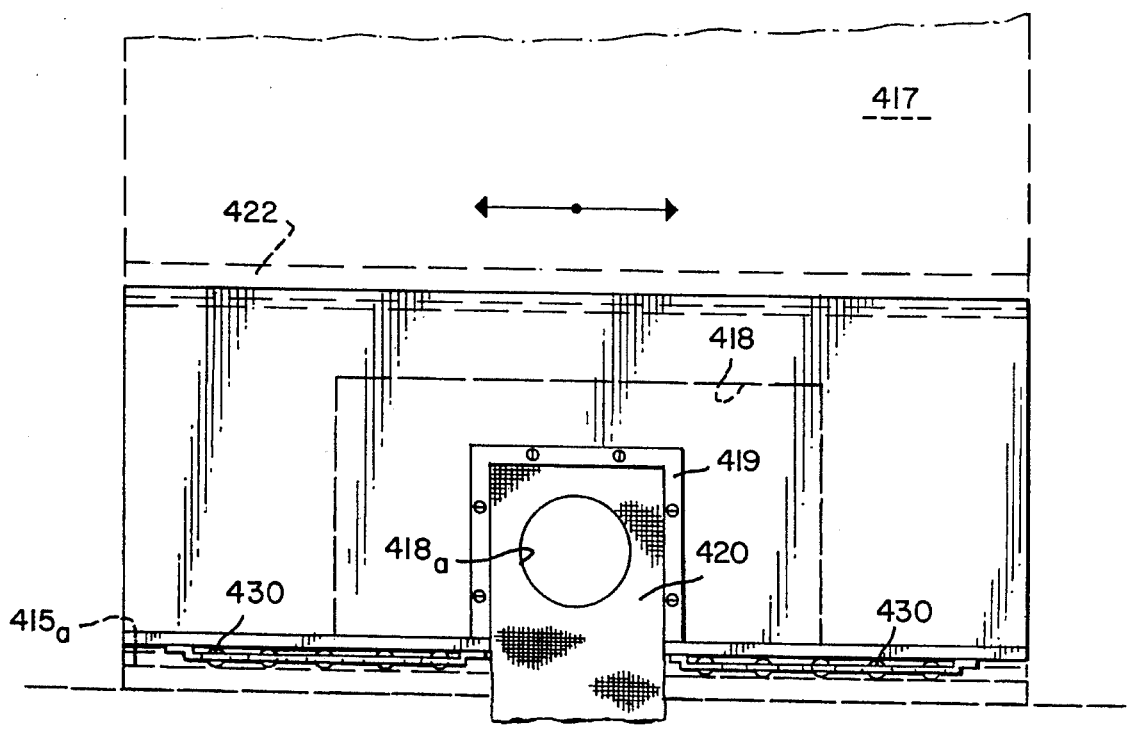
FIG.4-D

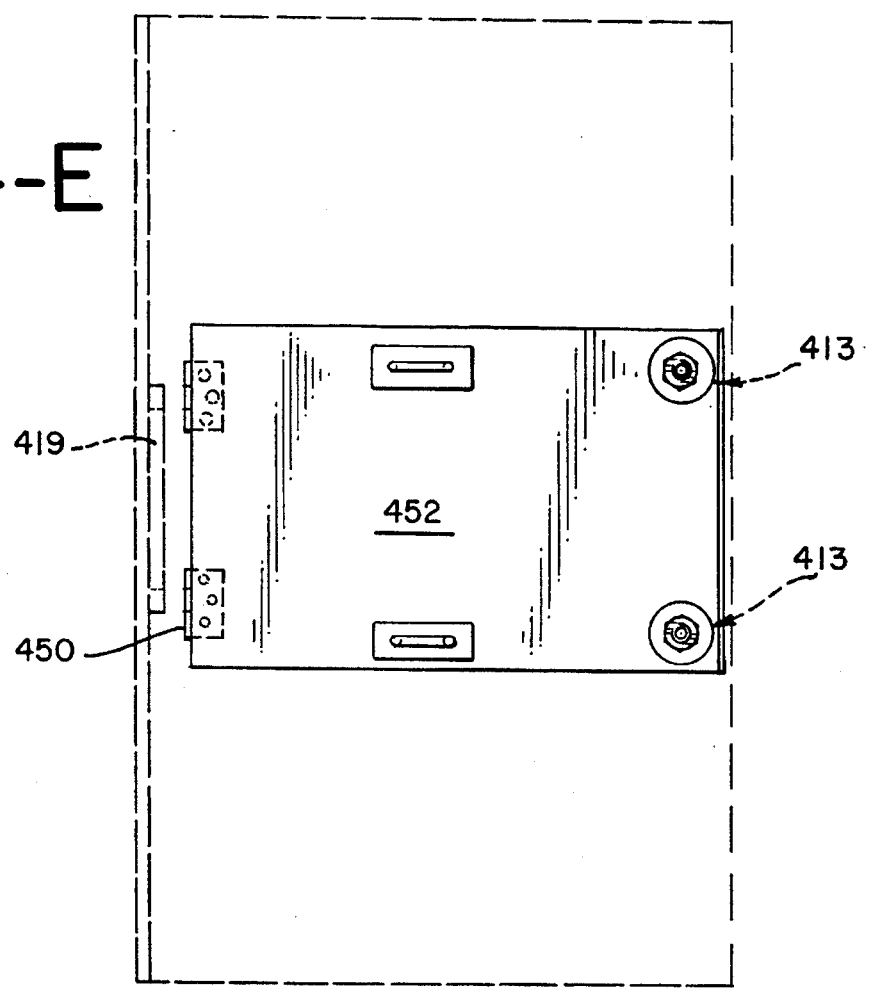
FIG.4-E
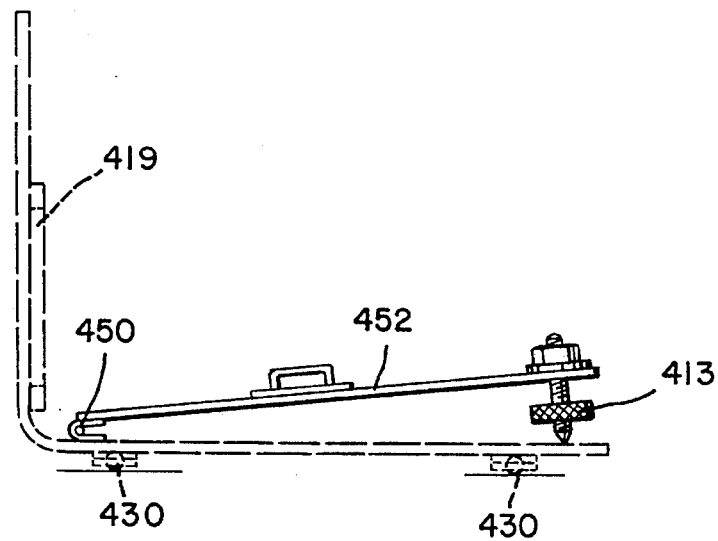
FIG.4-F

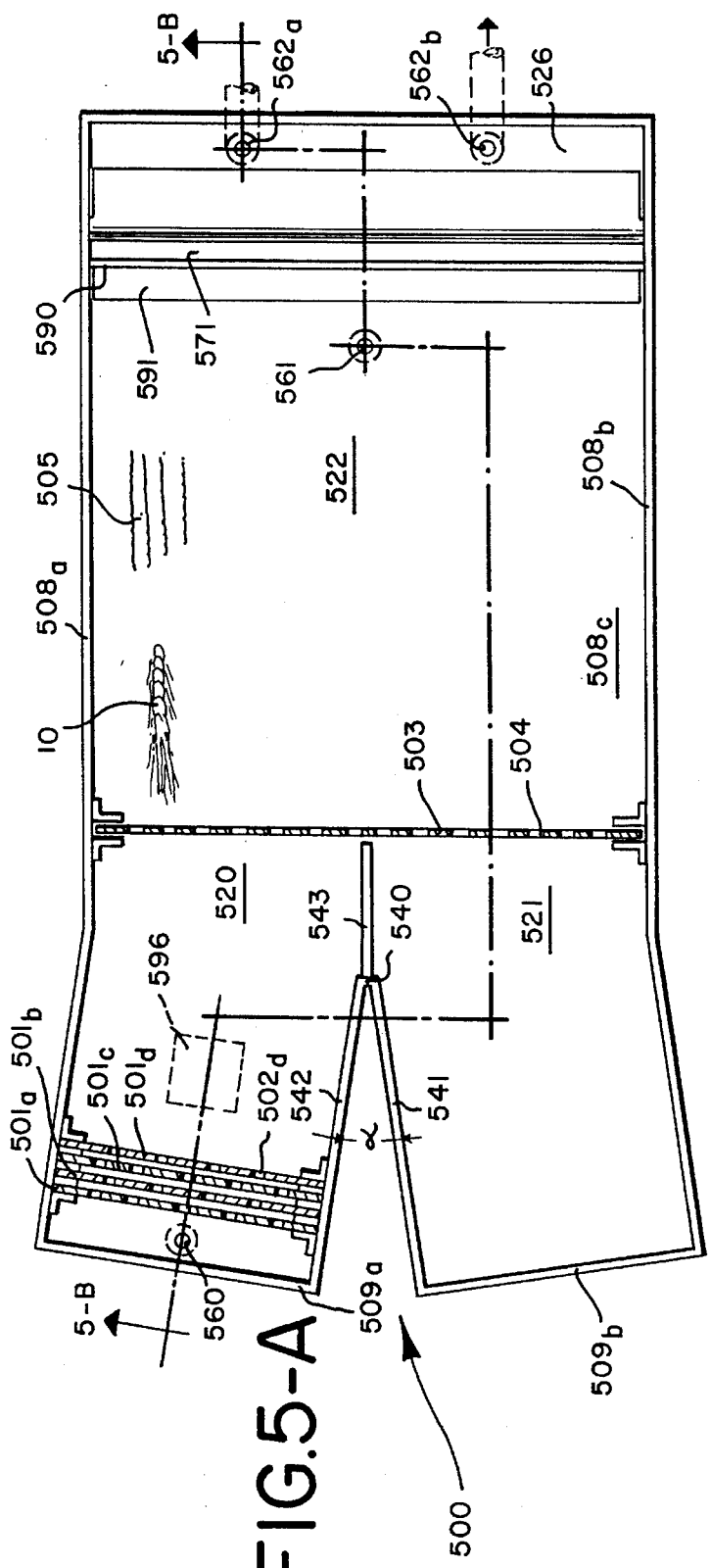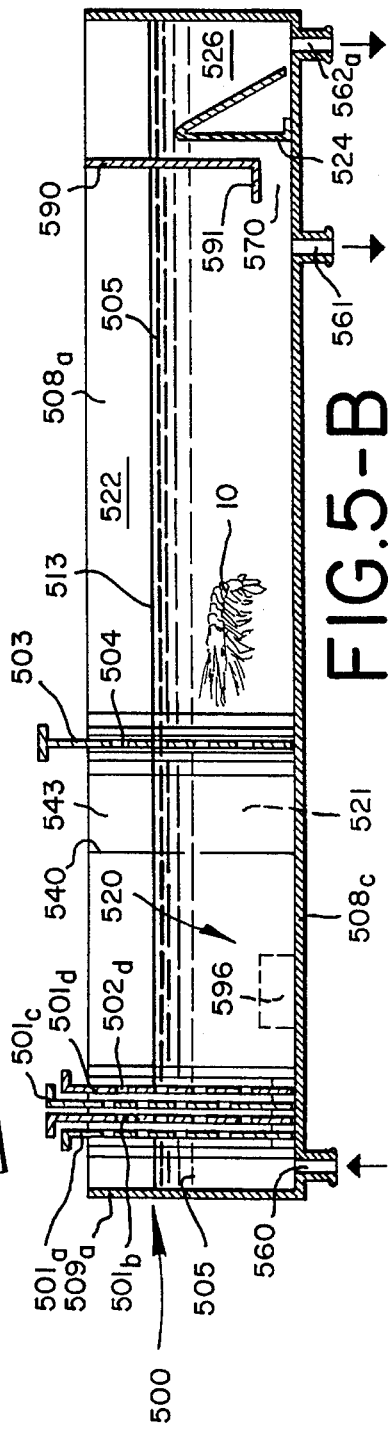

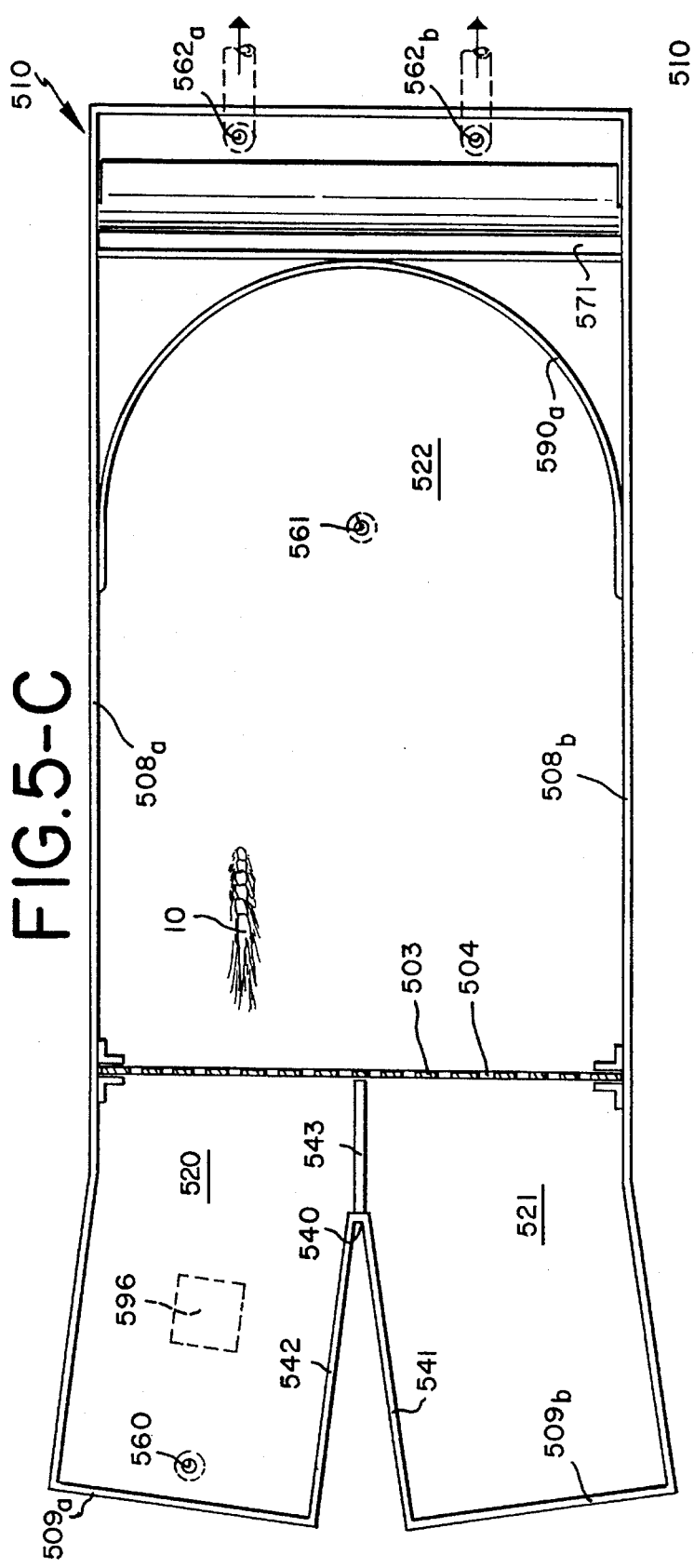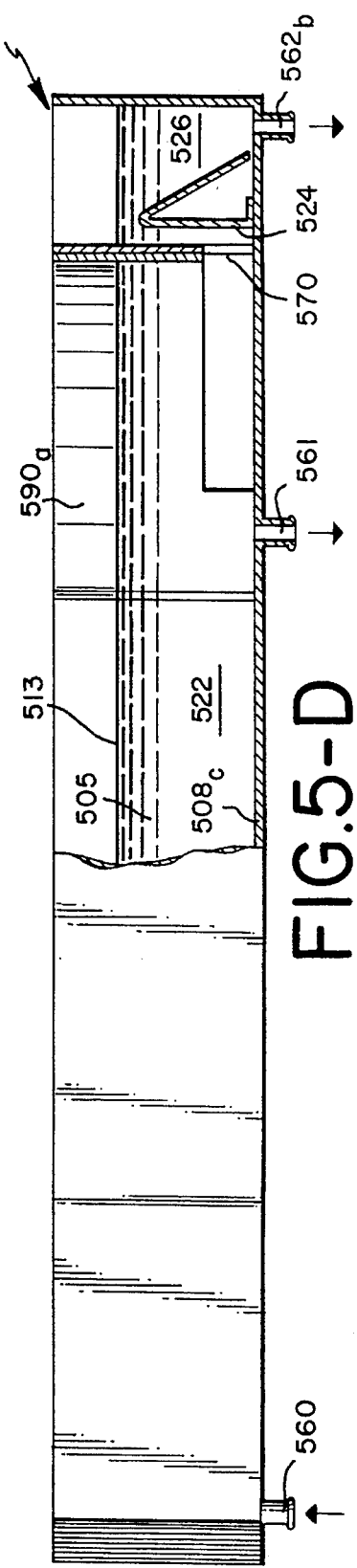

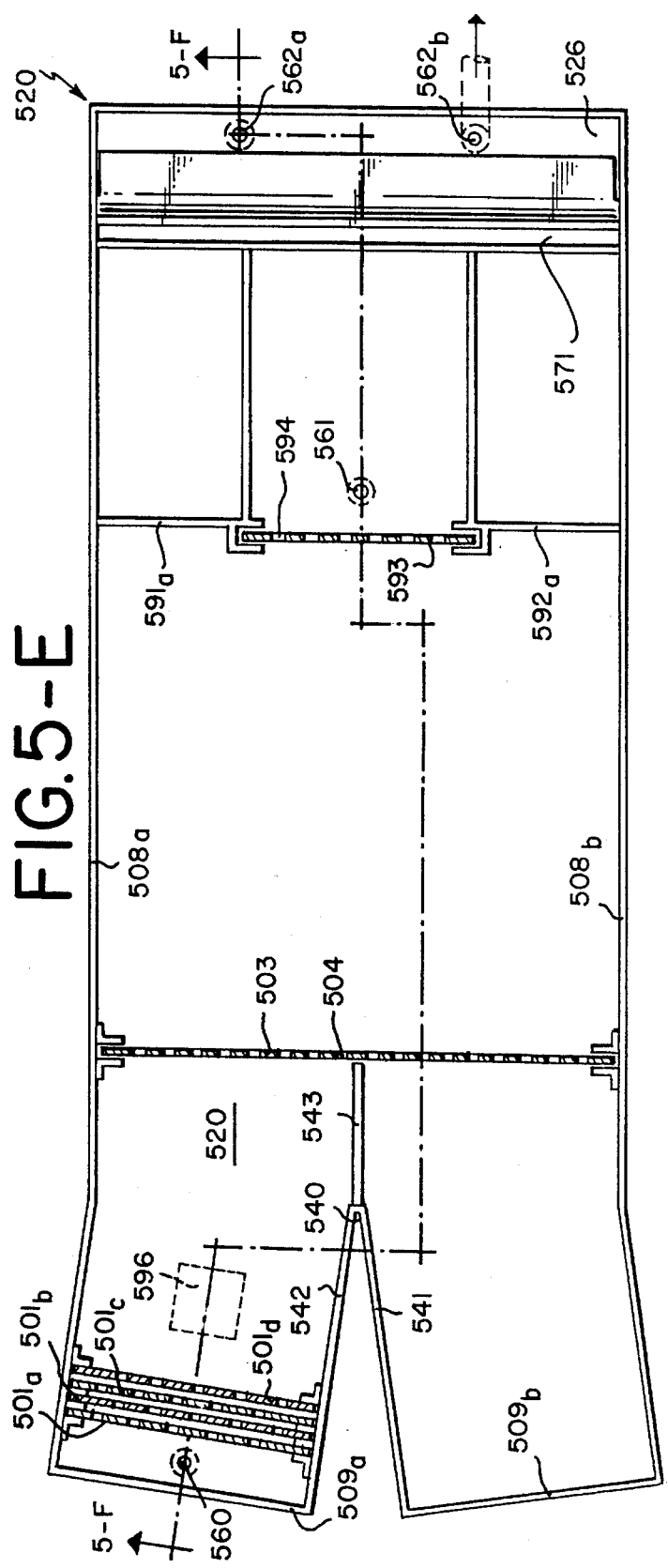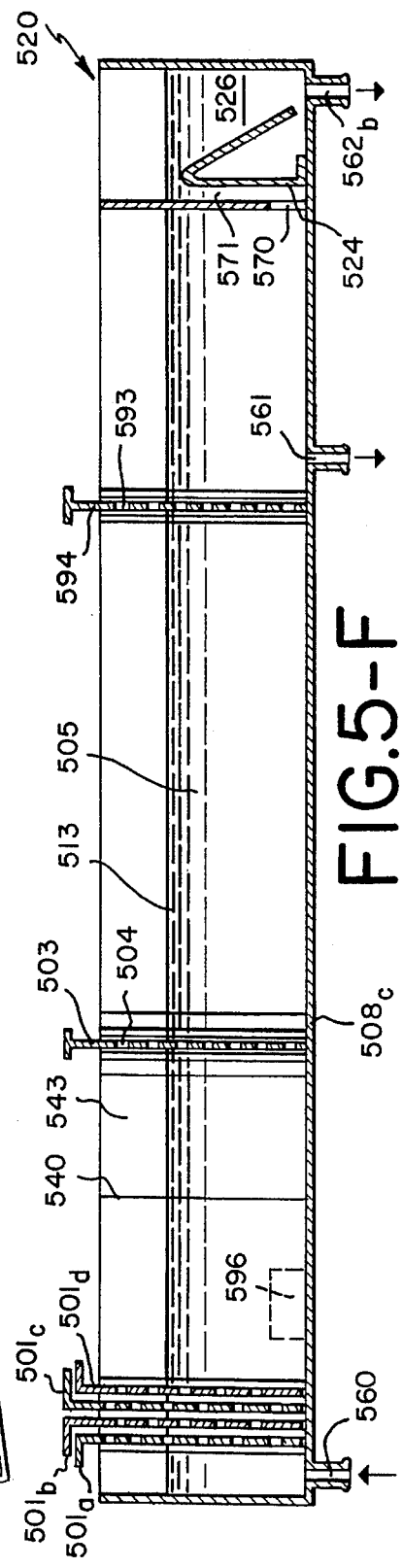

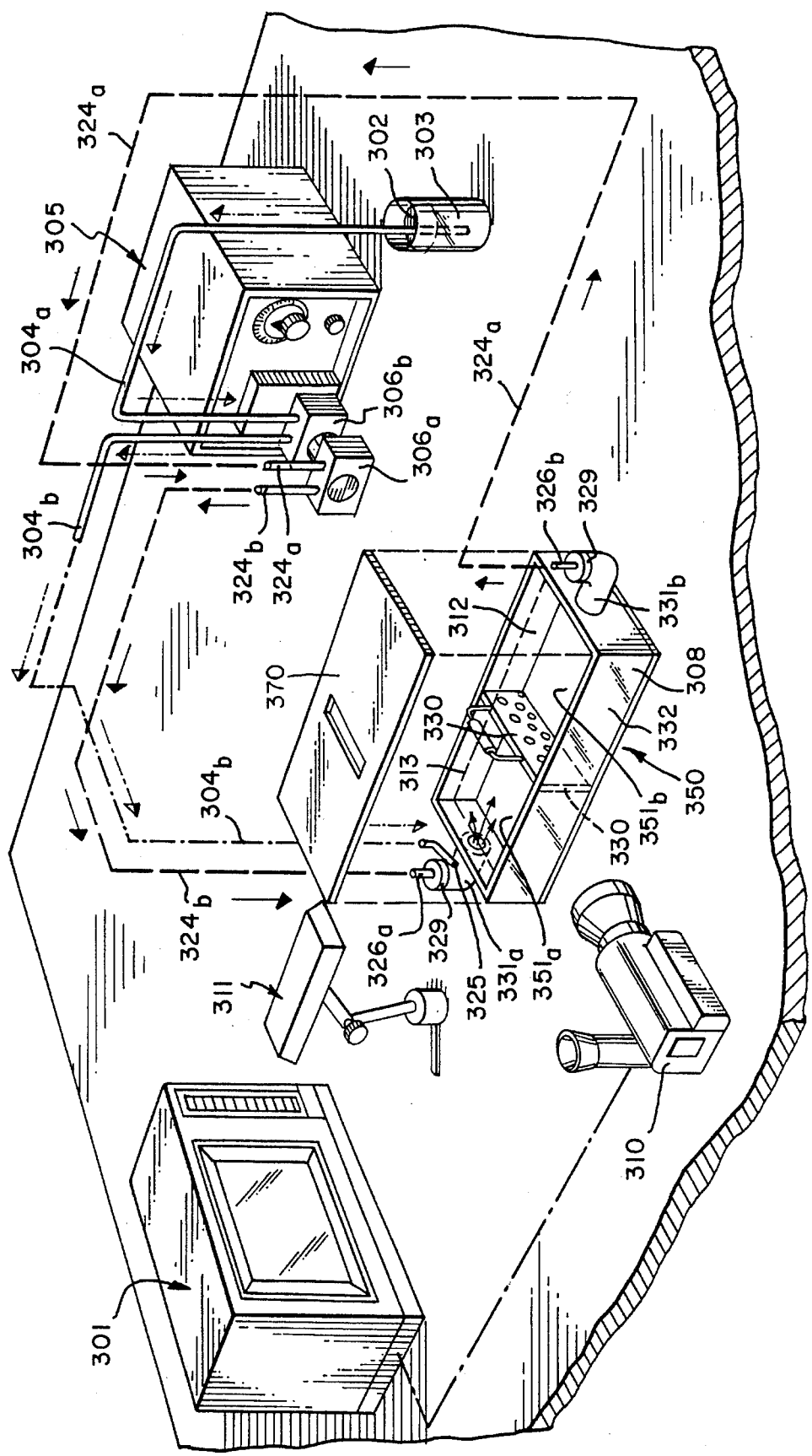

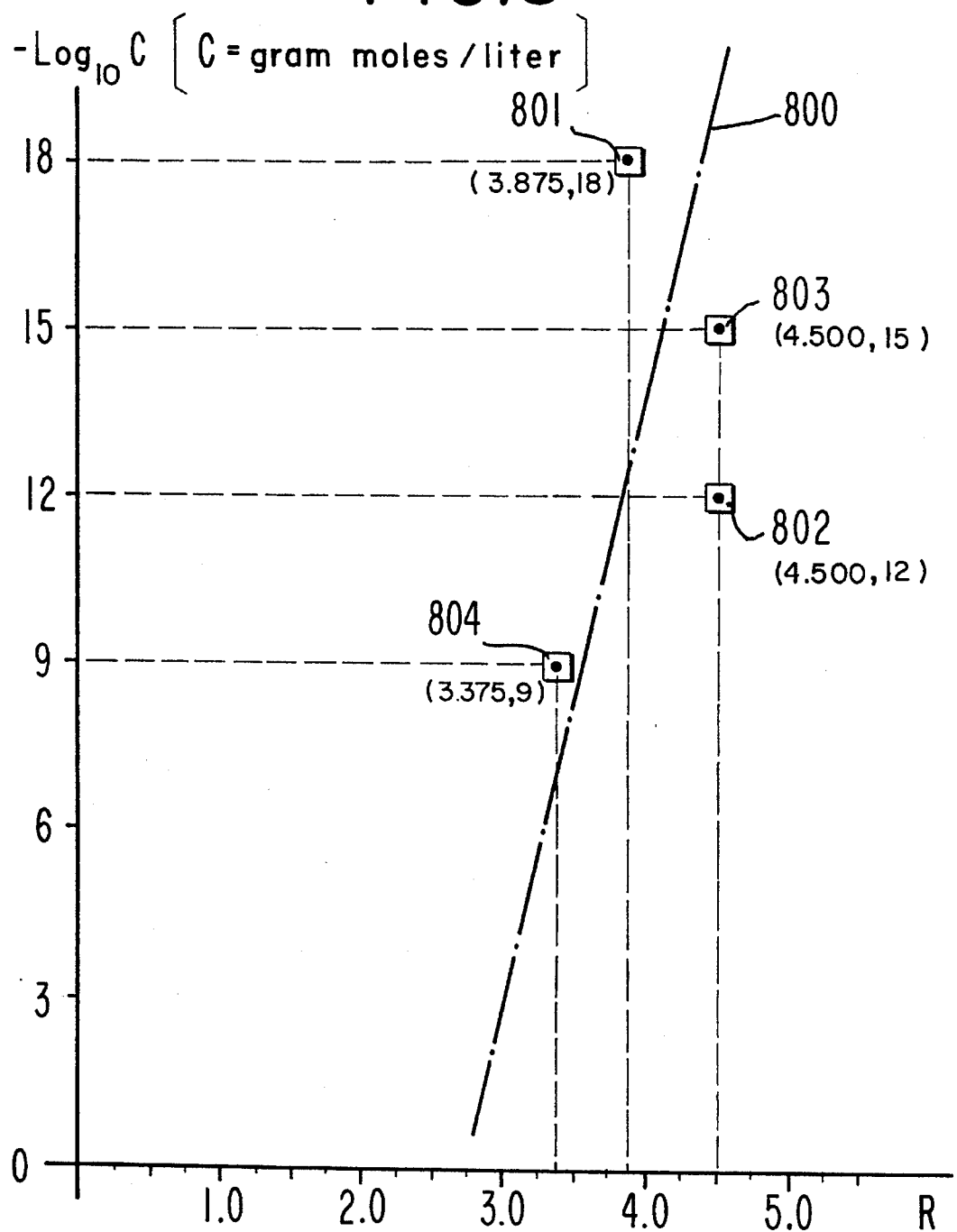

L C PROFILE

METHOD AND APPARATUS FOR DETERMINING EXCITANTS AND ATTRACTANTS FOR THE PENAEUS GENUS OF CRUSTACEA

BACKGROUND OF THE INVENTION

Our invention is drawn to a process for determining excitants and attractants for members of the Penaeus genus of Crustacea, apparatus for carrying out such a process and a method for exciting and/or attracting members of the Penaeus genus of Crustacea by means of placing within a body of water near a surface or volume to which such Crustacea are desired to be attracted, a Crustacea attracting concentration of at least one of the substances:

(i) N-acetyl-alpha-D-Glucosamine, a mixture of compounds having the structures:

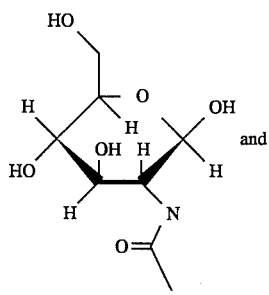

and

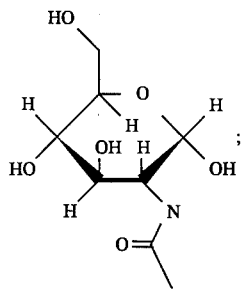

(ii) S-methyl methionine sulfonium chloride having the structure:

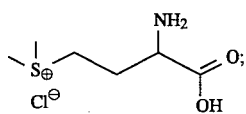

(iii) trimethyl amine oxide hydrate having the structure:

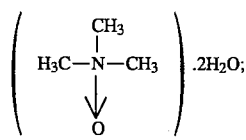

(iv) 1-octen-3-ol having the structure:

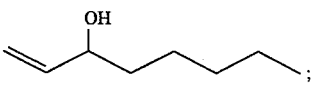

(v) methional having the structure:

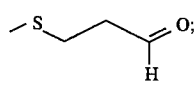

(vi) dimethyl sulfoxide having the structure:

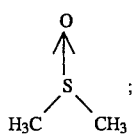

(vii) 50:50 mole:mole mixture of skatole/indole, skatole having the structure:

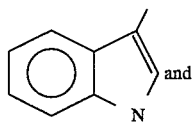

and indole having the structure:

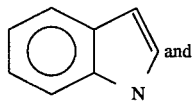

and (viii) propionthetin (bromide) having the structure:

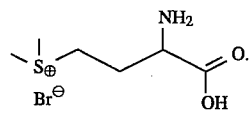

Aquatic animals utilize water-borne "chemical signals" (chemical stimuli) to identify and orient toward potential prey, to escape predators and locate mates. These specific chemical signals are recognized in spite of the chemical complexity of aquatic environments. Therefore, the chemical ecology of aquatic animals is vitally important, both physiologically and behaviorally, to understand the status and role of animals in the aquatic environment. The function of specific chemical signals becomes even more significant in a managed biological system (i.e., aquaculture ponds or tanks) that is optimized for production of a single aquatic species (e.g., members of the Penaeus genus of Crustacea) since these chemical signals regulate feeding behavior and control reproduction. Because feeds are a significant expense in all aquaculture operations, the need to maximize feeding rates and reduce wasted feed, thereby lowering production costs, is paramount to economic success.

The importance of chemoattractants and/or feeding stimulants in improving both initial palatability and overall feeding rates as a means to reduce wasted feed is now fully recognized. The feed quality and environmental conditions (i.e., water quality and current patterns) have direct effects on the effectiveness of feed attractants and feed stimulants. For these reasons, food detection and feeding stimulation ultimately determine the commercial value of an aquatic feed.

A number of attempts at obtention of efficacious feeding stimulants for various aquatic species and for creation of appropriate testing apparatus having a high degree of efficiency for determining good stimulants and attractants for aquatic species are set forth in the literature. Thus, U.S. Pat. Nos. 4,250,835 issued Feb. 17, 1981 and 4,249,480 issued Feb. 10, 1981 disclose apparatus and methods for rearing shrimp through the larvae stage wherein the shrimp are subjected to controlled conditions and a common enclosure for the male and female adult shrimp is provided which permits uncontrolled access of the shrimp to one another and wherein the shrimp are maintained through a plurality of cycles of mating, spawning and hatching. The system disclosed provides filtration means for filtering the medium of the common enclosure and with collecting means for collecting hatched shrimp at preselected times from the common enclosure medium as the medium moves into the filtration means. U.S. Pat. No. 4,828,829 of May 9, 1989 discloses a visual fish attractant that visually attracts fish and aids in the dispersion of traditional scent and taste attractants. The fish attractant compositions include one or more oils, such as mineral oil, cod liver oil, menhaden oil, herring oil, anise oil, salmon oil, as well as pigments, fragrances, fish scent, dispersed pigments, and light-reflective particles that act both as a visual attractant and as an aid to controlled dispersion of the oil and scent compositions.

Lombardo, et al, Comp.Biochem.Physiol.,Vol. 101C, No. 2, pages 389–398, 1992, "Amino Acids And Derivatives As Food-Finding Signals In The Freshwater Snail *Planorbarius Corneus* (L.) discloses the behavioral responses of the freshwater snail to various amino acids including L-aspartic acid, D-alanine, histamine, proline, and aspartame.

Nothing in the prior art however discloses the efficient process for attracting members of the Penaeus genus of Crustacea from a volume of water inhabited by said member of the Penaeus genus of Crustacea to a desired surface or volume within a body of water by applying at least one of the specific materials found to be useful in our invention, to wit:

(i) N-acetyl-alpha-D-Glucosamine, a mixture of compounds having the structures:

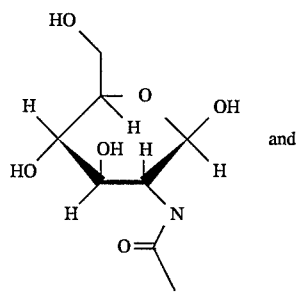 and 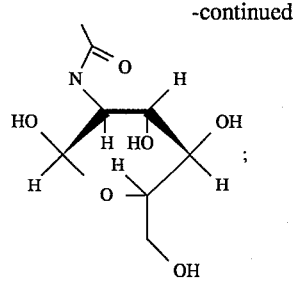

(ii) S-methyl methionine sulfonium chloride having the structure:

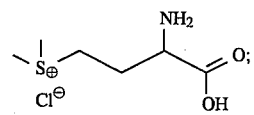

(iii) trimethyl amine oxide hydrate having the structure:

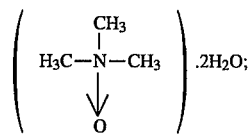

(iv) 1-octen-3-ol having the structure:

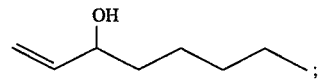

(v) methional having the structure:

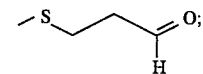

(vi) dimethyl sulfoxide having the structure:

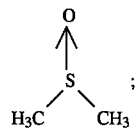

(vii) 50:50 mole:mole mixture of skatole/indole, skatole having the structure:

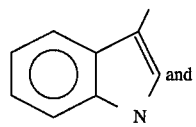 and indole having the structure:

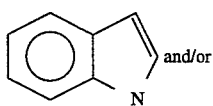 and/or (viii) propiothetin (bromide) having the structure:

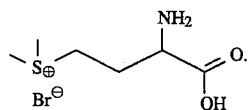

It should be pointed out however that the compounds having the structures:

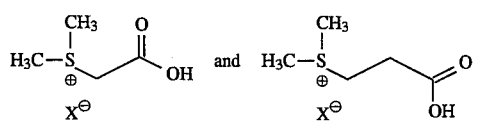

wherein X is a "univalent anion" such as chloro or bromo are used to attract in a gel vertebrate fish such as red snapper and carp in Japanese Published Application J91/27231 (Nakajima) abstracted at Chem. Abstracts Volume 115:113303n. The disclosure of Japanese Published Application 91/27231 does not detract from the patentability of the instant invention.

THE INVENTION

Accordingly, our invention provides a process for attracting a member of the Penaeus genus of Crustacea from a volume of water inhabited by said member of the Penaeus genus of Crustacea to a desired surface or volume within a body of water comprising the step of applying an aqueous solution containing a Crustaceion-attracting concentration of a material selected from the group consisting of:

(i) N-acetyl-alpha-D-Glucosamine, a mixture of compounds having the structures:

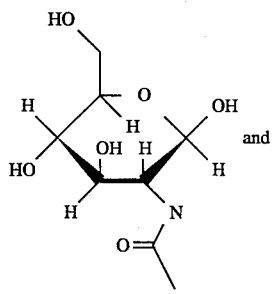

and

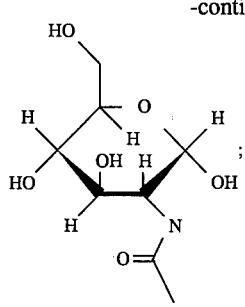

(ii) S-methyl methionine sulfonium chloride having the structure:

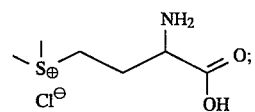

(iii) trimethyl amine oxide hydrate having the structure:

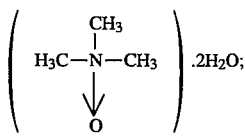

(iv) 1-octen-3-ol having the structure:

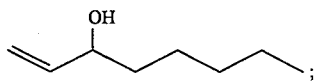

(v) methional having the structure:

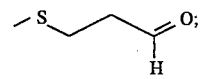

(vi) dimethyl sulfoxide having the structure:

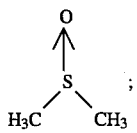

and (vii) 50:50 mole:mole mixture of skatole/indole, skatole having the structure:

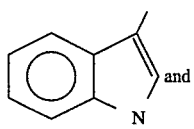 and indole having the structure:

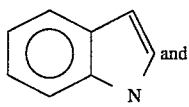 and (viii) propionthetin (bromide) having the structure:

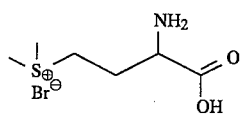

to the vicinity of said desired surface or volume. Our invention also describes a process for exciting a member of the Penaeus genus of Crustacea within a volume of water inhabited by such member of the Penaeus genus of Crustacea comprising the seep of applying an aqueous solution containing a Crustaceion-exciting concentration of one of the above materials to the vicinity of said volume inhabited by said member of the Penaeus genus of Crustacea. Examples of such Penaeus genus of Crustacea are *Penaeus setiferus* and *Penaeus vannamei*.

Our invention is also directed to apparatus for determining whether a given substance at a given aqueous concentration attracts or excites a member of the Penaeus genus of Crustacea comprising:

(a) static holding tank means containing (i) a volume of water and (ii) at least one live member of the Penaeus genus of Crustacea within said volume of water;

(b) pump generated test solution feeding means for pumping aqueous solutions at variable or constant flow rates of test material into the static holding tank means;

(c) visible light generating and guidance means for guiding visible wave length light of variable or constant intensity into said volume of water in said static holding tank means;

(d) first variable power source means for engaging the visible light generating means;

(e) second variable power source means for engaging the pump generated feeding means; and (f) variable focus camera recording means for recording the movements of one or more portions and/or the lateral direction and velocity of one or more members of the Penaeus genus of Crustacea when the pump generated feeding means and visible light generating means are engaged whereby, it can be determined whether a particular dilution of a test substance will cause a member of the Penaeus genus of Crustacea to be "excited" or to be "attracted".

Additional apparatus of our invention is also covered herein for determining whether a given substance at a given aqueous concentration or variable concentrations will attract or excite members of the Penaeus genus of Crustacea. Such apparatus comprises:

(a) flow through holding tank means where varying concentrations of test solutions are fed in at the inlet of the holding tank means and flow through the holding tank to an exit portal while a member of the Penaeus genus of Crustacea is held within the "flow through" holding tank. The holding tank contains (i) flowing water and (ii) at least one live member of the Penaeus genus of Crustacea within the flowing water;

(b) the apparatus also contains pump generated test solution feeding means for pumping aqueous solutions at variable or constant flow rates of test material into an orifice in front of the entry portal into the flow through holding tank;

(c) the apparatus also contains visible light generating and guidance means for guiding visible wave length light of variable or constant intensity into the volume of water flowing in the flow through holding tank;

(d) the apparatus also contains a first variable power source for energizing or "engaging" the visible light generating means;

(e) the apparatus also contains a variable power source for energizing or "engaging" the pump generated feeding means; and (f) the apparatus also contains variable focus camera recording means for recording the movements of one or more portions and/or the lateral direction and velocity of one or more members of the Penaeus genus of Crustacea when the pump generated feeding means is engaged and when the visible light generating means is engaged.

The variable focus camera recording means is of necessity on a line of visibility between the camera lens and the limits of motion of the member of the Penaeus genus of Crustacea. Accordingly, the apparatus of our invention must contain one or two clear panels behind which is located the camera and in front of which is located at every point of view of the lens of the camera all of the members of the Penaeus genus of Crustacea within the flow through holding tank or within the static holding tank as the case may be.

Another aspect of our invention concerns an additional apparatus for determining whether a given substance at a given aqueous concentration attracts or excites a member of the Penaeus genus of Crustacea and it comprises a "y-maze" apparatus similar no that disclosed in the paper by Lee, J.Exp.Mar Biol.Ecol., Volume 153, (1992), pages 53–67 "Chemotaxis by Octopus maya Voss et Solis in a Y-maze". Although similar to the Y-maze of the instant invention, the apparatus disclosed by Lee in the immediately aforementioned reference is different in kind rather than degree from the apparatus of the instant invention.

Thus, the apparatus of the instant invention comprises:

(a) a static holding tank means containing a Y-maze which is a rectangular parallelepiped having one closed end and one opened end and two sides each sealably connected to the end panel and each terminating at the open end, said open end connected to two diverging parallelepiped-shaped sections; (i) a feeding section and (ii) a control section each of which is sealably connected at the open end to one another and no a side of the first rectangular parallelepiped. This apparatus has one or both top and bottom panels as transparent panels whereby a variable focus camera recording means is maintained on one side of the transparent panel with a line of vision from the lens of the camera to every place where all of the members of the Penaeus genus of Crustacea may travel.

The y-maze apparatus of our invention also contains a volume of water and at least one live member of the Penaeus genus of Crustacea within the volume of water. The Y-maze apparatus of our invention contains a pump generated test solution of feeding means for pumping aqueous solutions at various flow rates or constant flow rates into the feeding section of the Y-maze (one of the diverging "arms" connected to the first parallelepiped).

Like the flow through apparatus and the static tank apparatus, the "Y-maze" apparatus has a visible light generating and guidance means for guiding visible wave length light of variable or constant intensity into the volume of water in the holding tank where the members of the Penaeus genus of Crustacea are located and where they can travel to the feeding section of the apparatus.

The "Y-maze" aspect of the apparatus of our invention also contains variable focus camera recording means for recording the movements of one or more portions and/or the lateral direction and velocity of one or more of the members of the Penaeus genus of Crustacea when the pump generated feeding means and when the visible light generating means are energized or "engaged".

More specifically, in determining a value for the response, "R" of the member of the Penaeus genus of Crustacea whose responses are measured as a result of the practice of our invention, the time taken for the member of the Penaeus genus of Crustacea to act or to respond to the feeding "stimulant" or to the "attractant" or to the "excitant" of our invention is a function of the particular material used and its concentration as well as the flow rate of the liquid.

Two proposed mathematical models are set forth herein, to wit:

$$G_1 = \frac{100}{\theta} - 5$$

and $$G_2 = 100 - 10\theta$$

wherein the term:

$$\theta$$

is the time taken and the terms "$G_1$" and "$G_2$" are each values for the responses of the members of the Penaeus genus of Crustacea from the initial time "0" of feeding until the time that a given definitive lateral motion commences. The rate of change of response with respect to concentration is given by the equation:

$$\frac{dG_2}{dC} = -10\left(\frac{d\theta}{dC}\right)$$

wherein the symbol:

$$\frac{d\theta}{dC}$$

is the rate of change of time with respect to concentration, that is, time of response and the symbol:

$$\frac{dG_2}{dC}$$

is the rate of change of response with respect to concentration as is the symbol:

$$\frac{dG_1}{dC}$$

A similar equation is:

$$\frac{dG_1}{dC} = \frac{-100}{\theta^2}\left(\frac{d\theta}{dC}\right)$$

which depends on the mathematical model:

$$G_1 = \frac{100}{\theta} - 5.$$

Combining the initial mathematical model with the differential equation yields the differential equation:

$$\frac{dG_1}{dC} + G_1 = \frac{100}{\theta} - \frac{100}{\theta^2}\left(\frac{d\theta}{dC}\right) - 5$$

and the differential equation:

$$\frac{dG_2}{dC} + G_2 = 100 - 10\left(\frac{d\theta}{dC}\right) - 10\theta.$$

Changes in response value when concentrations of stimulant change or when concentrations of excitant change are shown by the equations:

$$\Delta G = \int_{C_1}^{C_2} \left(\frac{\partial G}{\partial C}\right)_\theta dC$$

$$\Delta G_1 = \int_{C_1}^{C_2} \left(\frac{\partial G_1}{\partial C}\right)_\theta dC$$

$$\Delta G_2 = \int_{C_1}^{C_2} \left(\frac{\partial G_2}{\partial C}\right)_\theta dC.$$

Thus, for example, in the case of the use of N-acetyl-alpha-D-Glucosamine, a mixture of compounds having the structures:

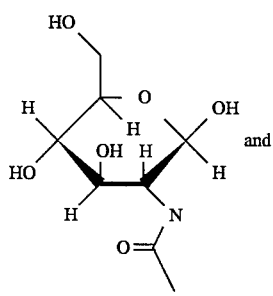

and

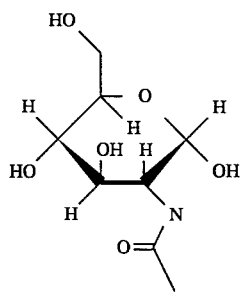

the response versus concentration can be shown by the equation:

$$-\log_{10} C = 0.8G - 2.3$$

or by one of the equations:

$$\log_{10}C = 2.3 - 0.8G$$

$$0.8G = 2.3 - \log_{10}C$$

$$G = 2.9 - 1.25 \log_{10}C$$

$$G_1 = 2.9 - 1.25 \log_{10}C$$

$$G_2 = 2.9 - 1.25 \log_{10}C$$

or $$G_2 = 2.9 - 2.9 \log_e C$$

Furthermore, the rate of change of response with respect to concentration can be shown by the equations:

$$\frac{\partial G_2}{\partial C} = \frac{-2.9}{C}$$

and $$\frac{\partial G_1}{\partial C} = \frac{-2.9}{C}$$

and the change in response can be shown by the equation:

$$\Delta G_1 = \int_{C_1}^{C_2} \left( \frac{-2.9}{C} \right) dC = -2.9 \log_e \left( \frac{C_2}{C_1} \right).$$

Combining the equation:

$$G_1 = 2.9 - 2.9 \log_e C$$

with the equation:

$$\frac{dG_1}{dC} = \frac{-2.9}{C}$$

and the equation:

$$\frac{dG_1}{dC} + G_1 = \frac{100}{\theta} - \frac{100}{\theta^2} \left( \frac{d\theta}{dC} \right) - 5$$

will yield the equation:

$$\frac{-2.9}{C} + 2.9 - 2.9\log_e C = \frac{100}{\theta} - \frac{100}{\theta^2} \left( \frac{d\theta}{dC} \right) - 5$$

and the equation:

$$7.9 - 2.9 \left( \frac{1}{c} + \log_e C \right) = 100 \left( \frac{1}{\theta} - \frac{1}{\theta^2} \left( \frac{d\theta}{dc} \right) \right)$$

wherein:

[G="R"].

Other materials which were tested but which have not been made a part of our invention are as follows:

(i) the compound having the structure:

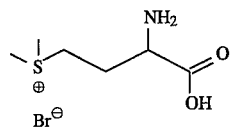

(ii) the compound having the structure:

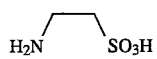

(iii) the compound having the structure:

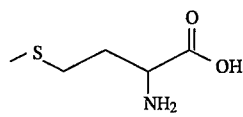

(iv) the compound having the structure:

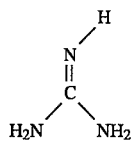

(v) the compound having the structure:

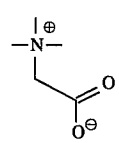

(vi) the compound having the structure:

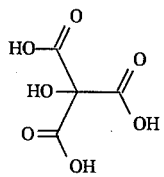

(vii) the compound having the structure:

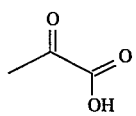

(viii) the compound having the structure:

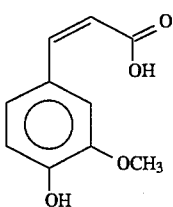

(ix) the compound having the structure:

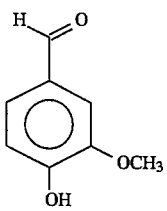

(x) the compound having the structure:

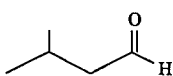

(xi) the compound having the structure:

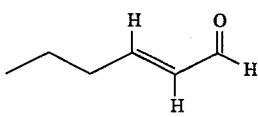

(xii) the mixture of compounds having the structures:

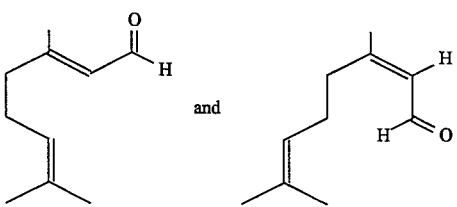

("Citral-IFF");

(xiii) the mixture of compounds having the structures:

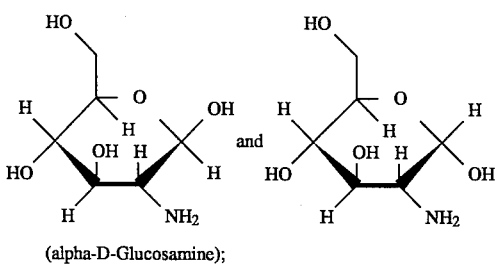

(alpha-D-Glucosamine);

(xiv) Thaumatin (known as TALIN® a trademark of the Tate and Lyle Company Limited of the United Kingdom), a mixture of Thaumatin B, Thaumatin I and Thaumatin II the liquid chromatograms of which are indicated in FIGS. 23 and 24 attached hereto and described, infra. Thaumatin I is shown also by the symbol:

[$Lys^{46}$, $Asp^{113}$, $Asp^{137}$]

as further specifically described in U.S. Pat. No. 5,221,624 issued on Jun. 22, 1993 the specification of which is incorporated herein by reference.

Each of the substances of our invention tested is diluted in a saline solution containing 30 parts per thousand of a "FRITZ ®" Super Salt Concentration manufactured by the Fritz Chemical Company of Dallas, Tex. 75217. The "FRITZ®" Super Salt Concentrate contains in major amounts sodium chloride, magnesium sulfate, magnesium chloride and calcium chloride and in minor amounts lithium chloride, sodium molyedate, disodium phosphate, strontium chloride, potassium chloride, sodium bicarbonate, calcium carbonate and magnesium carbonate.

The protocols for using the apparatus of our invention are set forth as follows:

STATIC TANK: TESTING PROTOCOL

I. PREPARATION

1. APPARATUS

A. BETWEEN CHEMICALS

1. Soak test chamber (static tank) in warm water for at least one hour before testing different chemicals.
2. Rinse with hot tap water for approximately 30 seconds.
3. Rinse with de-ionized water for 10 seconds.
4. Dry off outside of chamber and place on test stand.
5. Replace peristaltic pump tubing before testing different chemicals.
6. Calibrate peristaltic pump to deliver at the predetermined flow rate.
7. Place tubing inflow and outflow ends into test chemical bottle.
8. Turn on peristaltic pump to fill tube with water and purge out all the air.
9. Adjust lighting for even illumination in the tank.
10. Set up camera in an appropriate area for viewing the entire bottom of the tank.
11. Pour 1000 mLs of sea water taken from the shrimp holding system into the test tank.

B. BETWEEN TRIALS USING THE SAME CHEMICAL

1. Rinse test tank with warm tap water for approximately 30 seconds.
2. Rinse with de-ionized water for 10 seconds.
3. Dry off outside of chamber and place on tank stand.
4. Between the trials using the same chemical or concentration of the same chemical, pump peristaltic pump tubing with at least 250 mLs salt water.
5. Calibrate peristaltic pump to deliver at the predetermined flow rate.
6. Place tubing inflow and outflow ends into test chemical bottle.

7. Turn on peristaltic pump to fill tube with water and purge out all the air.

8. Adjust lighting for even illumination in the tank.

9. Set up camera in an appropriate area for viewing the entire bottom of the tank.

10. Pour 1000 mLs of sea water taken from the shrimp holding system into the test tank.

STATIC TANK: TESTING PROTOCOL
(continued)

2. TEST ORGANISM

Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds, and walking legs).

1. Select an animal that appears to be calm (i.e., not repetitively hitting head into wall).

2. Net the animal carefully.

3. Place animal into the test tank.

4. Quickly set the cover over the test tank so the animal does not jump out.

5. If an animal jumps out of the tank or net at any time during transfer, pick it up and place it back into the holding chamber and choose another animal.

II. TEST PROCEDURE

1. PRETRIAL

1. When the animal is placed into the test tank, begin timing the acclimation period of 15 minutes.

2. Record the test date onto the data sheet.

3. When the acclimation period ends, record the acclimation time, and turn on the camera to record animal movements.

2. TRIAL

4. Immediately begin timing the run.

5. Observe and record on data sheet the placement and movements of the animal. Also note any problems that occurred during testing.

6. When the 5 minute test time is over, turn off the peristaltic pump, camera, and timer.

3. POST-TRIAL

7. Remove the chemical delivery tube from the tank and place into the test chemical bottle.

8. Pour the water from the test tank through a net into a waste bucket. The animal should now be in the net.

9. Place the animal into a group or individual holding chamber for later testing.

10. Begin preparation of apparatus and test animal.

FLOW-THROUGH TANK: TESTING PROTOCOL

I. PREPARATION

1. APPARATUS

A. BETWEEN CHEMICALS

1. Soak test chamber (flow-through tank) and divider in an alkaline solution and warm water for at least one hour before testing different chemicals.

2. Rinse with hot tap water for approximately 30 seconds.

3. Rinse with de-ionized water for 10 seconds.

4. Dry off outside of chamber and place on table.

5. Insert the tank divider into the appropriate groove in the center of the tank.

6. Replace peristaltic pump tubing before testing different chemicals.

7. Calibrate peristaltic pump to deliver at the predetermined flow rate.

8. Place smaller tubing inflow and outflow ends into test chemical bottle.

9. Attach larger recirculation tubing to the ends of the tank via the reducers. The flow of water should go from the tank end with the chemical inlet to opposite end of the tank.

10. Turn on peristaltic pump to fill tubes with water and purge out all the air.

11. Adjust lighting for even illumination in the tank.

12. Set up camera blind and camera in an appropriate area for viewing the entire test tank.

13. Pour 500 mLs of sea water taken from the shrimp holding system into the test tank.

B. BETWEEN TRIALS USING THE SAME CHEMICAL

1. Rinse test tank and tank divider with warm tap water for approximately 30 seconds.

2. Rinse with de-ionized water for 10 seconds.

3. Dry off outside of chamber and place on table.

4. Insert the tank divider into the appropriate groove in the center of the tank.

5. Between the trials using the same chemical or concentration of the same chemical, pump peristaltic pump tubing with at least 1 L salt water.

6. Calibrate peristaltic pump to deliver at the predetermined flow rate.

7. Place smaller tubing inflow ,and outflow ends into test chemical bottle.

8. Attach larger recirculation tubing to the ends of the tank via the reducers. The flow of water should go from the tank end with the chemical inlet to opposite end of the tank.

9. Turn on peristaltic pump to fill tubes with water and purge out all the air.

10. Adjust lighting for even illumination in the tank.

11. Set up camera blind and camera in an appropriate area for viewing the entire test tank.

12. Pour 500 mLs of sea water taken from the shrimp holding system into the test tank.

FLOW-THROUGH TANK: TESTING PROTOCOL—(continued)

2. TEST ORGANISM

Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds, and walking legs).

1. Select an animal that appears to be calm (i.e., not repetitively hiring head into wall).
2. Net the animal carefully.
3. Place animal into the test tank in the end nearest the tank outflow, facing the inflow (face the animal against the future flow of water).
4. Quickly set the cover over the test tank so the animal does not jump out.
5. If an animal jumps out of the tank or net at any time during transfer, pick it up and place it back into the holding chamber and choose another animal.

II. TEST PROCEDURE

1. PRETRIAL

1. When the animal is placed into the test tank, begin timing the acclimation period. The duration of the acclimation period should be the period of time it takes for the animal to become calm (i.e., not bumping into walls and not attempting to swim or turn in tank). This period should be at least one minute.
2. Record the test date onto the data sheet.
3. Turn on peristaltic pump to allow water to circulate in the test chamber.
4. When the acclimation period ends, record the acclimation time, and turn on the camera to record animal movements.

2. TRIAL

5. Immediately begin timing the run.
6. Carefully remove the tank divider.
7. Wait 5 seconds. If the animal lunges to the inlet side of the test tank during this time, terminate testing.
8. If the animal stays on the outlet end of the tank, place the chemical outlet tube into the test chemical inlet of the tank.
9. Wait 30 seconds. If the animal lunges to the inlet side of the test tank during this time, terminate testing.

FLOW-THROUGH TANK: TESTING PROTOCOL—(continued)

10. Observe and record on data sheet the placement and movements of the animal. Also note any problems that occurred during testing.
11. When the predetermined test time is over, turn off the peristaltic pump, camera, and timer.

3. POST-TRIAL

12. Remove the chemical delivery tube from the chemical delivery inlet and place into the test chemical bottle.
13. Remove large recirculation tubing and begin cleaning (see Apparatus Preparation above).
14. Pour the water from the test tank through a net into a waste bucket. The animal should now be in the net.
15. Place the animal into a group or individual holding chamber for later testing.
16. Begin preparation of apparatus and test animal.

Y-MAZE: TESTING PROTOCOL

I. PREPARATION

1. APPARATUS

A. BETWEEN CHEMICALS

1. Soak test chamber (Y-maze) and divider in an alkaline solution and warm water for at least one hour before testing different chemicals.
2. Rinse with hot tap water for approximately 30 seconds.
3. Rinse with de-ionized water for 10 seconds.
4. Dry off outside of chamber and place on table.
5. Insert the tank divider (removable screen) into the appropriate groove in the center of the Y-maze.
6. Replace peristaltic pump tubing before testing different chemicals.
7. Calibrate peristaltic pump to deliver at the predetermined flow rate.
8. Place tubing inflow and outflow ends into test chemical bottle.
9. Turn on peristaltic pump to fill tube with liquid and purge out all the air.
10. Adjust lighting for even illumination in the tank.
11. Set up camera in an appropriate area for viewing the entire Y-maze.
12. Fill Y-maze to the proper water level with 4 L sea water taken from the shrimp holding system.

B. BETWEEN TRIALS USING THE SAME CHEMICAL

1. Rinse y-maze and divider with warm tap water for approximately 30 seconds.
2. Rinse with de-ionized water for 10 seconds.
3. Dry off outside of chamber and place on table.
4. Insert the tank divider into the appropriate groove in the center of the Y-maze.
5. Between the trials using the same chemical or concentration of the same chemical, pump peristaltic pump tubing with at least 250 mLs salt water.
6. Calibrate peristaltic pump to deliver at the predetermined flow rate.
7. Place smaller tubing inflow and outflow ends into test chemical bottle.
8. Turn on peristaltic pump to fill tube with liquid and purge out all the air.
9. Adjust lighting for even illumination in the Y-maze.
10. Set up camera in an appropriate area for viewing the entire Y-maze.
11. Fill Y-maze to the proper water level with 4 L sea water taken from the shrimp holding system.

Y-MAZE: TESTING PROTOCOL—(continued)

2. TEST ORGANISM

Animals should be chosen from a previously isolated set of animals so repetition does not occur within the test set for a particular chemical concentration. All test animals should be free of chitinolytic bacteria if possible. Most importantly, animals should have all head and mouth appendages (antennules, antennae, maxillae, maxillipeds, and walking legs).

1. Select an animal that appears to be calm (i.e., not repetitively hitting head into wall).
2. Net the animal carefully.
3. Place animal into the center of the Y-maze (in the base of the Y-maze).
4. Quickly set the cover over the Y-maze so the animal does not jump out.
5. If an animal jumps out of the tank or net at any time during transfer, pick it up and place it back into the holding chamber and choose another animal.

II. TEST PROCEDURE

1. PRETRIAL

1. When the animal is placed into the Y-maze, begin timing the acclimation period. The duration of the acclimation period should be the period of time it takes for the animal to become calm (i.e., not bumping into wails and not attempting to swim or turn in tank). This period should be at least one minute.
2. Record the test date onto the data sheet.
3. When the acclimation period ends, record the acclimation time, and turn on the camera to record animal movements.

2. TRIAL

4. Immediately begin timing the run.
5. Carefully remove the divider.
6. Wait 5 seconds. If the animal lunges into an arm of the Y-maze during this time, terminate testing.
7. If the animal stays on the base of the Y-maze, place the chemical outlet tube into the test chemical inlet of the Y-maze.
8. Wait 30 seconds. If the animal lunges into an arm of the Y-maze during this time, terminate testing.

Y-MAZE: TESTING PROTOCOL—(continued)

9. Observe and record on data sheet the placement and movements of the animal. Also note any problems that occurred during testing.
10. When the predetermined test time is over, turn off the peristaltic pump, camera, and timer.

3. POST-TRIAL

11. Remove the chemical delivery tube from the chemical delivery inlet and place into the test chemical bottle.
12. Remove Y-maze recirculation tubing and begin cleaning (see Apparatus Preparation above).
14. Pour the water from the y-maze through a net into a waste bucket. The animal should now be in the net.
15. Place the animal into a group or individual holding chamber for later testing.
16. Begin preparation of apparatus and test animal.

FEEDING BEHAVIOR: TESTING PROTOCOL

1. PREPARATION

1. APPARATUS

A. BETWEEN CHEMICALS

1. Soak test chamber (Y-maze) and divider in an alkaline solution and warm water for at least one hour before testing different chemicals.
2. Rinse with hot tap water for approximately 30 seconds.
3. Rinse with de-ionized water for 10 seconds.
4. Dry off outside of chamber and place on table.
5. Insert the tank divider (removable screen) into the appropriate groove in the center of the Y-maze.
6. Replace peristaltic pump tubing before testing different chemicals.
7. Calibrate peristaltic pump to deliver at the predetermined flow rate.
8. Place tubing inflow and outflow ends into test chemical bottle.
9. Turn on peristaltic pump to fill tube with liquid and purge out all the air.
10. Adjust lighting for even illumination in the tank.
11. Set up camera in an appropriate area for viewing the entire Y-maze.
12. Fill Y-maze to the proper water level with 4 L sea water taken from the shrimp holding system.

B. BETWEEN TRIALS USING THE SAME CHEMICAL

1. Rinse y-maze and divider with warm tap water for approximately 30 seconds.
2. Rinse with de-ionized water for 10 seconds.
3. Dry off outside of chamber and place on table.
4. Insert the tank divider into the appropriate groove in the center of the Y-maze.
5. Between the trials using the same chemical or concentration of the same chemical, pump peristaltic pump tubing with at least 250 mLs salt water.
6. Calibrate peristaltic pump to deliver at the predetermined flow rate.
7. Place smaller tubing inflow and outflow ends into test chemical bottle.
8. Turn on peristaltic pump to fill tube with liquid and purge out all the air.
9. Adjust lighting for even illumination in the Y-maze.
10. Set up camera in an appropriate area for viewing the entire Y-maze.
11. Fill Y-maze to the proper water level with 4 L sea water taken from the shrimp holding system.

FEEDING BEHAVIOR: TESTING PROTOCOL—(continued)

2. TEST ORGANISM

Animals should be chosen from a previously isolated set so repetition does not occur within the test set for a particular chemical concentration. All test animals should be free of chitinolytic bacteria if possible. Most importantly, animals should have all head and mouth appendages (antennules, antennae, maxillae, maxillipeds, and walking legs).

1. Select an animal that appears to be calm (i.e., not repetitively hitting head into wall).

2. Net the animal carefully.

3. Place animal into the center of the Y-maze (in the base of the Y-maze).

4. Quickly set the cover over the Y-maze so the animal does not jump out.

5. If an animal jumps out of the tank or net at any time during transfer, pick it up and place it back into the holding chamber and choose another animal.

II. TEST PROCEDURE

1. PRETRIAL

1. When the animal is placed into the Y-maze, begin timing the acclimation period. The duration of the acclimation period should be the period of time it takes for the animal to become calm (i.e., not bumping into walls and not attempting to swim or turn in tank). This period should be at least one minute.

2. Record the test date onto the data sheet.

3. When the acclimation period ends, record the acclimation time, and turn on the camera to record animal movements.

2. TRIAL

4. Immediately begin timing the run.

5. Insert feeding station with preweighed feed in place.

6. Carefully remove the divider.

7. Observe and record on a data sheet the placement and movements of the animal. Also note any problems that occurred during the testing.

8. When the predetermined test time is over, turn off the peristaltic pump, camera and timer.

9. Reweigh the feed to estimate the amount ingested by the animal.

Another aspect of our invention is the combination of the use of the static tank apparatus and procedure with the flow-through tank apparatus and procedure.

Another aspect of our invention is the use of the combination of the static tank apparatus, the flow through apparatus and the Y-maze apparatus and the procedure covering same.

BRIEF DESCRIPTION OF THE DRAWINGS

FIG. 2A is a schematic side elevation diagram of the static tank testing equipment.

FIG. 2B is a side view of the static tank testing equipment of FIG. 2A.

FIG. 2C is a perspective diagram of the static tank 208 shown in the static test apparatus of FIGS. 2A and 2B.

FIG. 3 is another schematic diagram of the static tank nesting apparatus of our invention showing the interrelationship of the projection device 201 with the camera means 210.

FIG. 3 is a schematic diagram showing the use of the flow-through testing apparatus of our invention.

FIG. 3A is a side elevation view of the flow-through tank in combination with the camera lens of the flow-through testing apparatus of our invention shown in FIG. 3.

FIG. 3B is a cut-away side elevation view of the flow-through tank of the flow-through nesting apparatus of FIG. 3 of our invention.

FIG. 3C is a front view of the variable focus camera of the flow-through apparatus of FIG. 3 of our invention.

FIG. 4 is a cut-away side elevation view of the variable focus camera used in conjunction with the variable or constant intensity light and the static tank testing apparatus of our invention.

FIG. 4A is a side elevation view of the support apparatus for the camera used in conjunction with the apparatus of FIG. 4.

FIG. 4B is a front view of the support equipment for the camera of FIG. 4.

FIG. 4C is a side elevation view of another embodiment of the apparatus used in conjunction with the camera of FIG. 4.

FIG. 4D is a front view of the support apparatus for the camera of FIG. 4.

FIG. 4E is a top view of the support apparatus for the apparatus of FIG. 4.

FIG. 4F is another embodiment of the support apparatus for the equipment of FIG. 4 including the video camera 410.

FIG. 5A is the top view (cut-away) of the Y-maze testing apparatus of our invention.

FIG. 5B is a cut-away side elevation view of the apparatus of FIG. 5A.

FIG. 5C is the top view of another embodiment of the Y-maze testing apparatus of our invention.

FIG. 5D is a cut-away side elevation view of the apparatus of FIG. 5C.

FIG. 5E is a top view (cut-away) of another embodiment of the Y-maze testing apparatus of our invention.

FIG. 5F is a cut-away side elevation view of the Y-maze testing apparatus of FIG. 5E.

FIG. 6 is a schematic diagram of Y-maze testing apparatus of the prior art.

FIG. 7A is a perspective view in schematic form of the flow-through testing apparatus of FIG. 3 of our invention.

FIG. 8 is a graph showing the response versus $[-\log_{10}C]$ with $[-\log_{10}C]$ on the "Y" axis and the response ("R") on the "X" axis for the testing of the mixture of compounds having the structures:

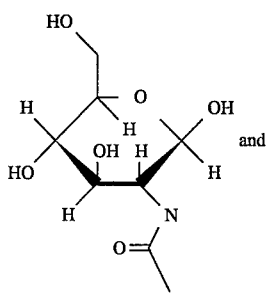

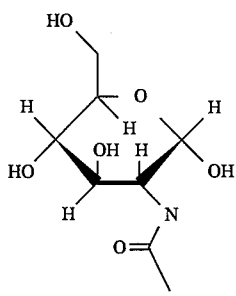

in the static tank testing apparatus.

Figure 9:
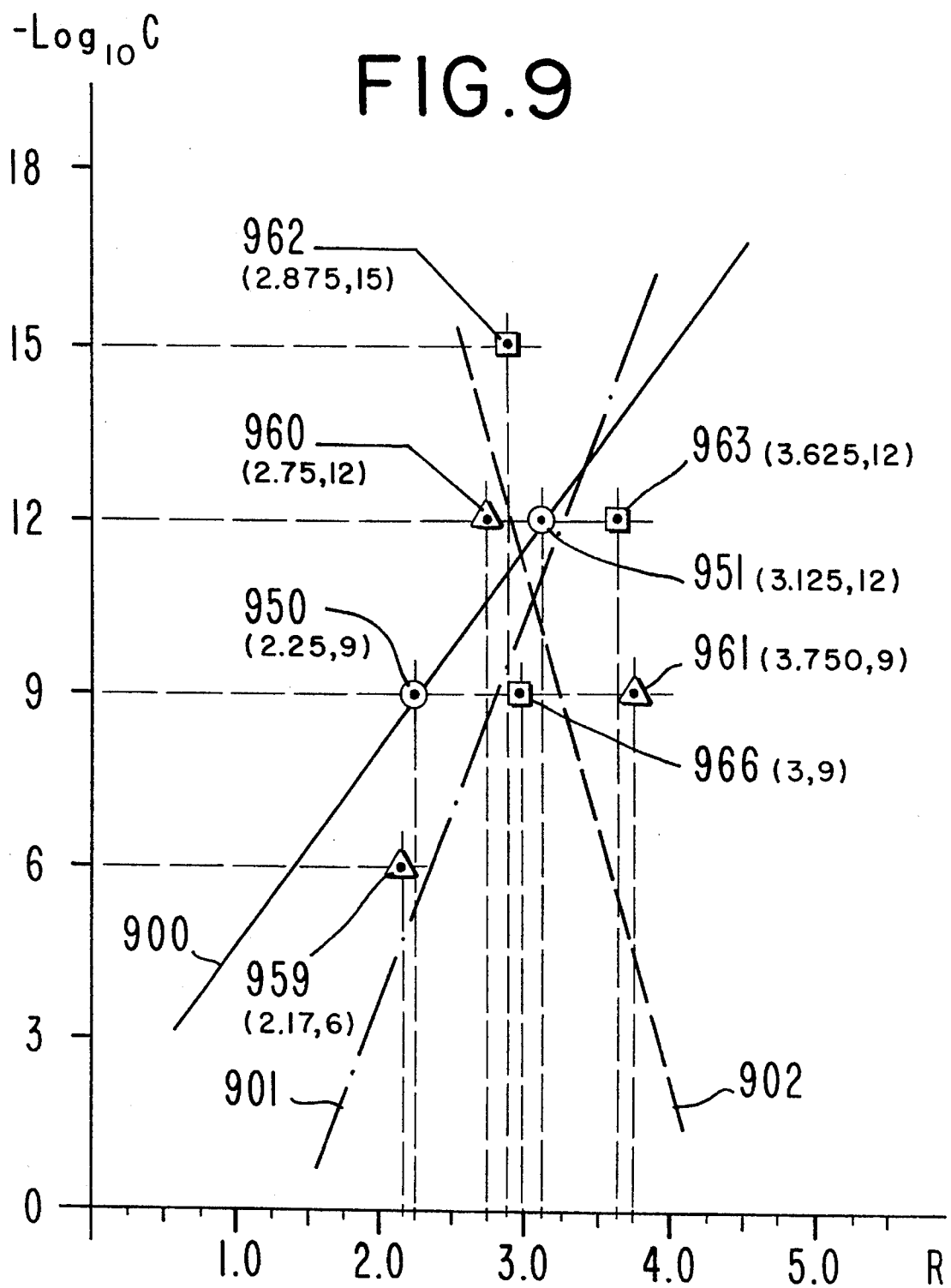
Figure 23:
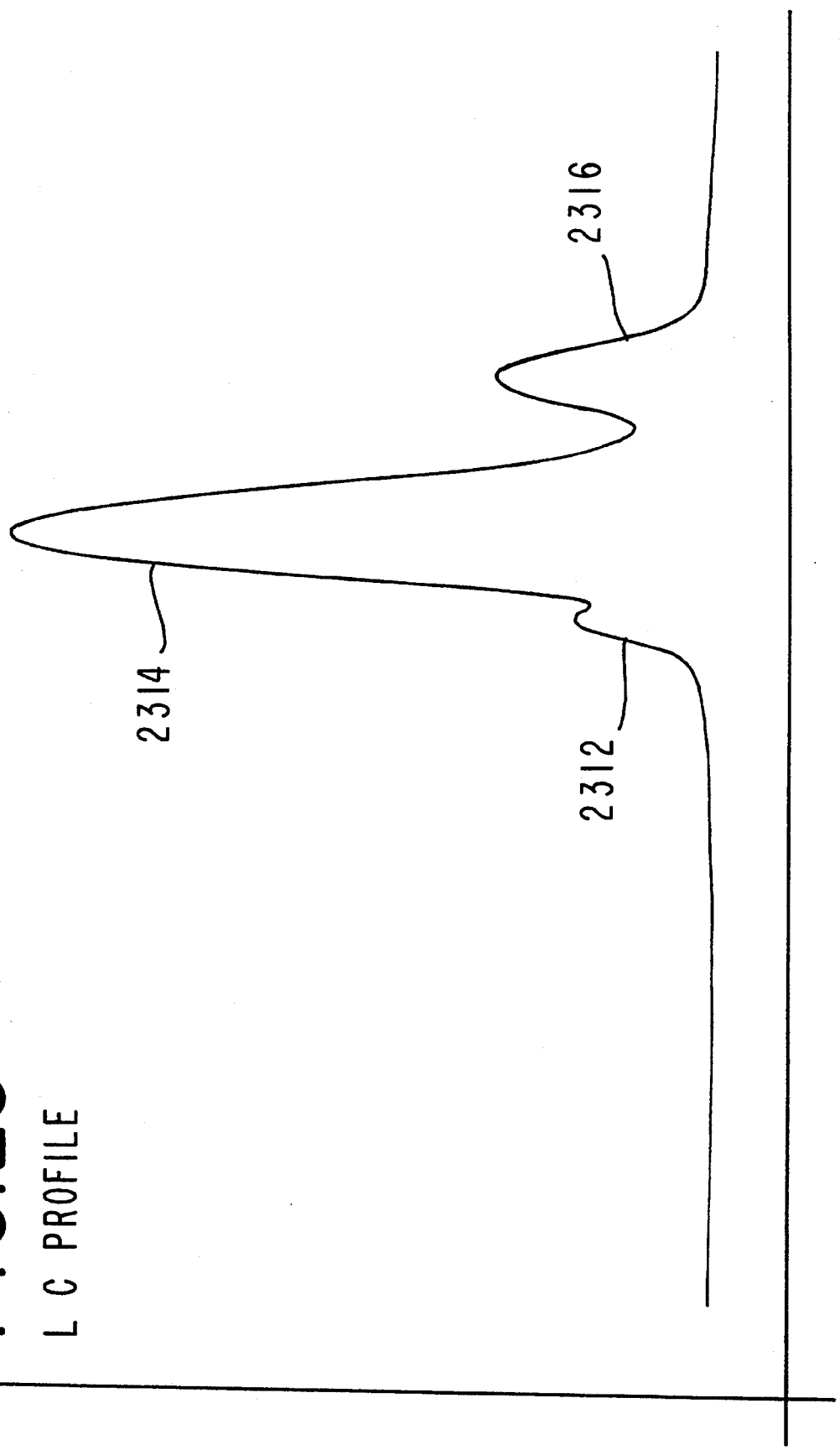
Figure 24:
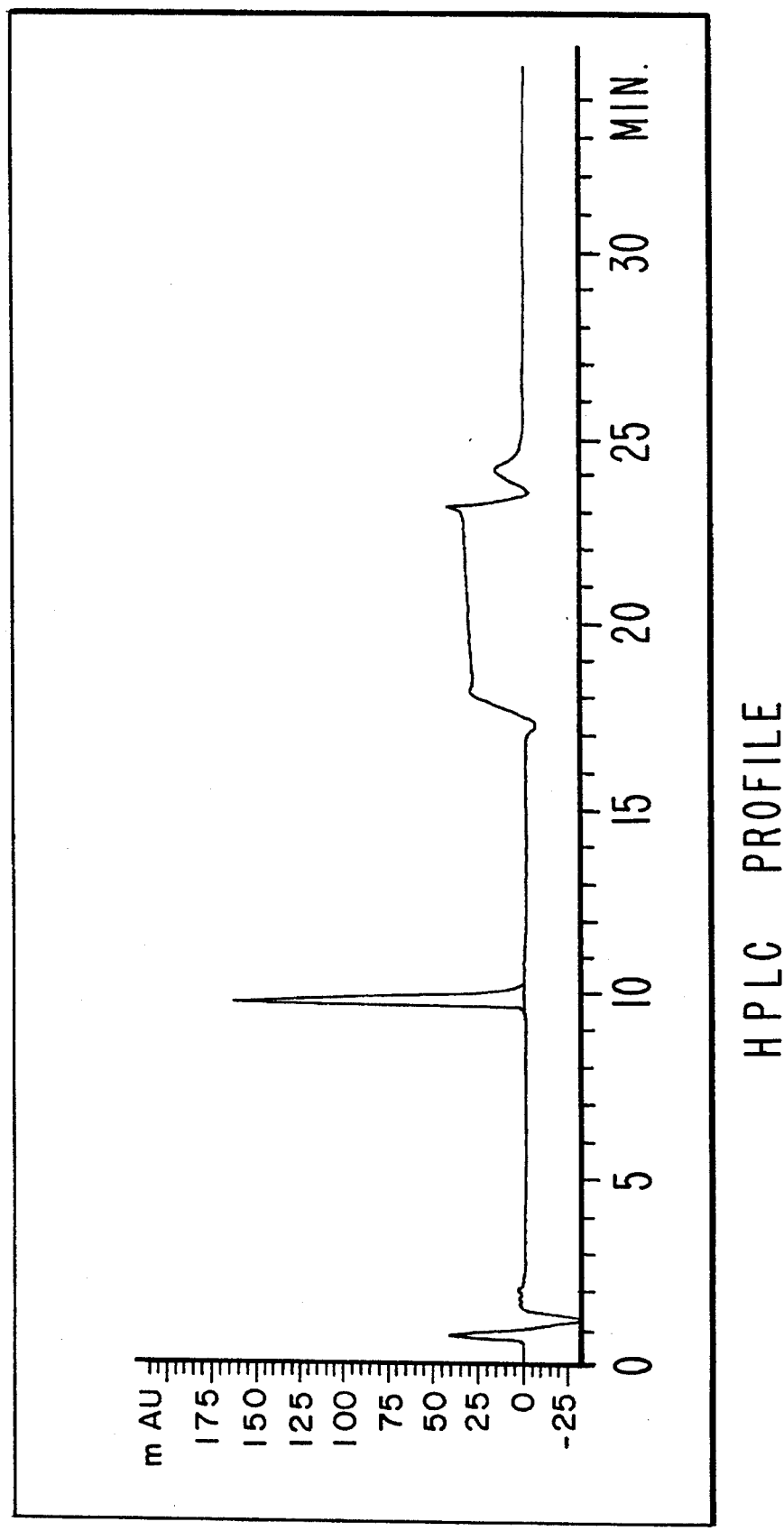

FIG. 9 is a series of graphs showing on the "Y" axis $[-\log_{10}C]$ and on the "X" axis the response, ("R") with "C" being in gram moles per liter for the materials:

(a) TALIN®, a mixture of Thaumatin I, Thaumatin II and Thaumatin B the liquid chromatograms of which are set forth in FIGS. 23 and 24 (TALIN® is a trademark of Tate and Lyle Limited of the United Kingdom);

(b) S-Methyl methionine sulfonium chloride having the structure:

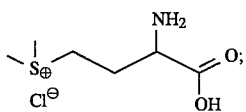

and (c) Alpha-D-Glucosamine, a mixture of compounds having the structures:

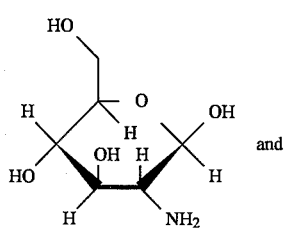

-continued

Figure 10:
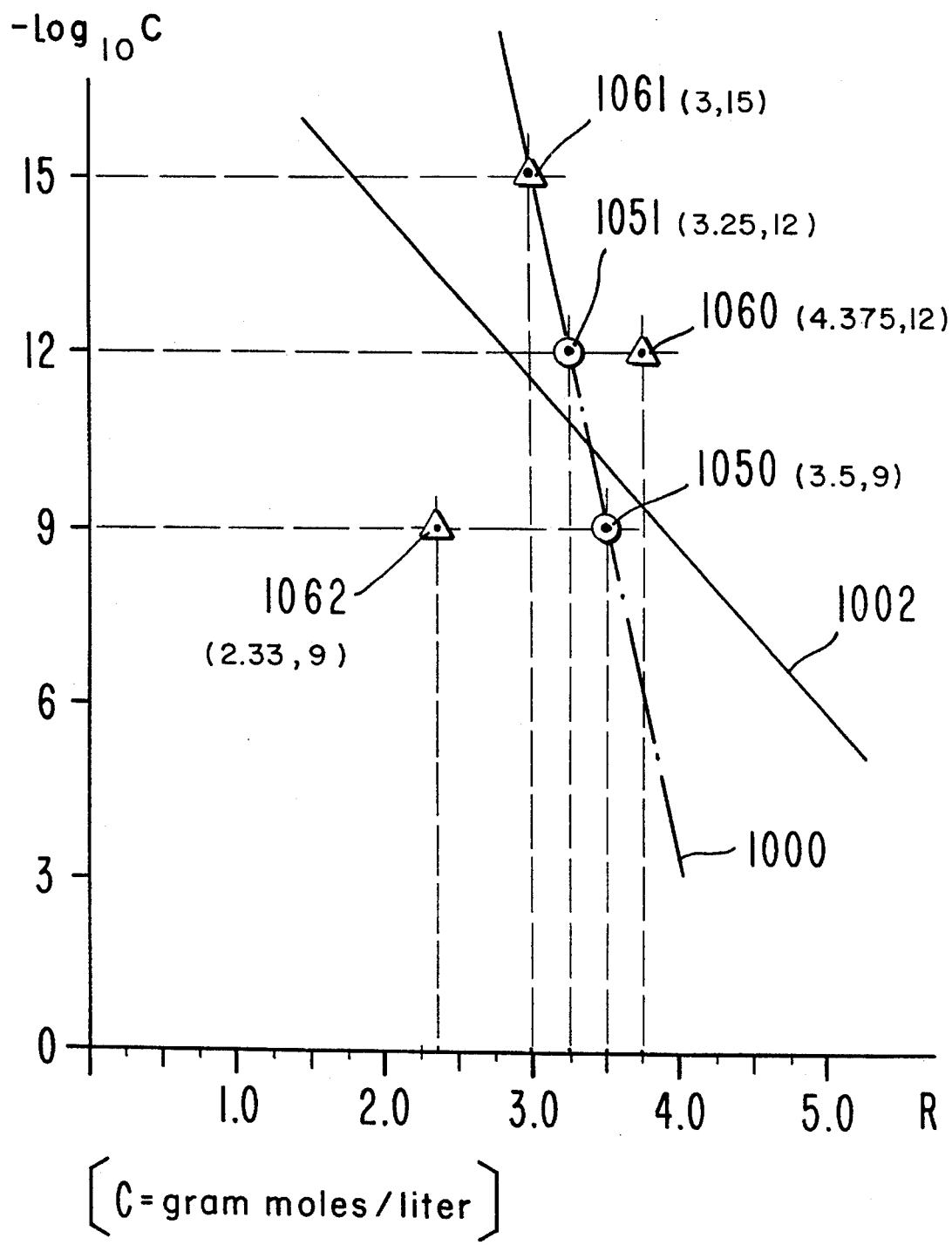

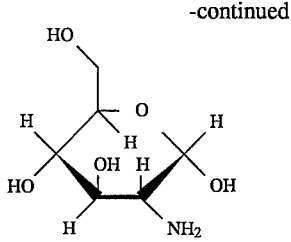

tested against *Penaeus vannamei* in a static tank testing apparatus of FIG. 2. FIG. 10 is a graph of $[-\log_{10}C]$ versus response "R" with $[-\log_{10}C]$ on the "Y" axis and ("R") on the "X" axis for the substances:

(a) trimethyl amine oxide hydrate having the structure:

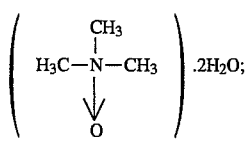

and (b) propiothetin (bromide) having the structure:

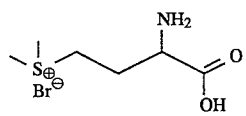

in the static tank testing apparatus of FIG. 2 as against *Penaeus vannamei*.

Figure 11:
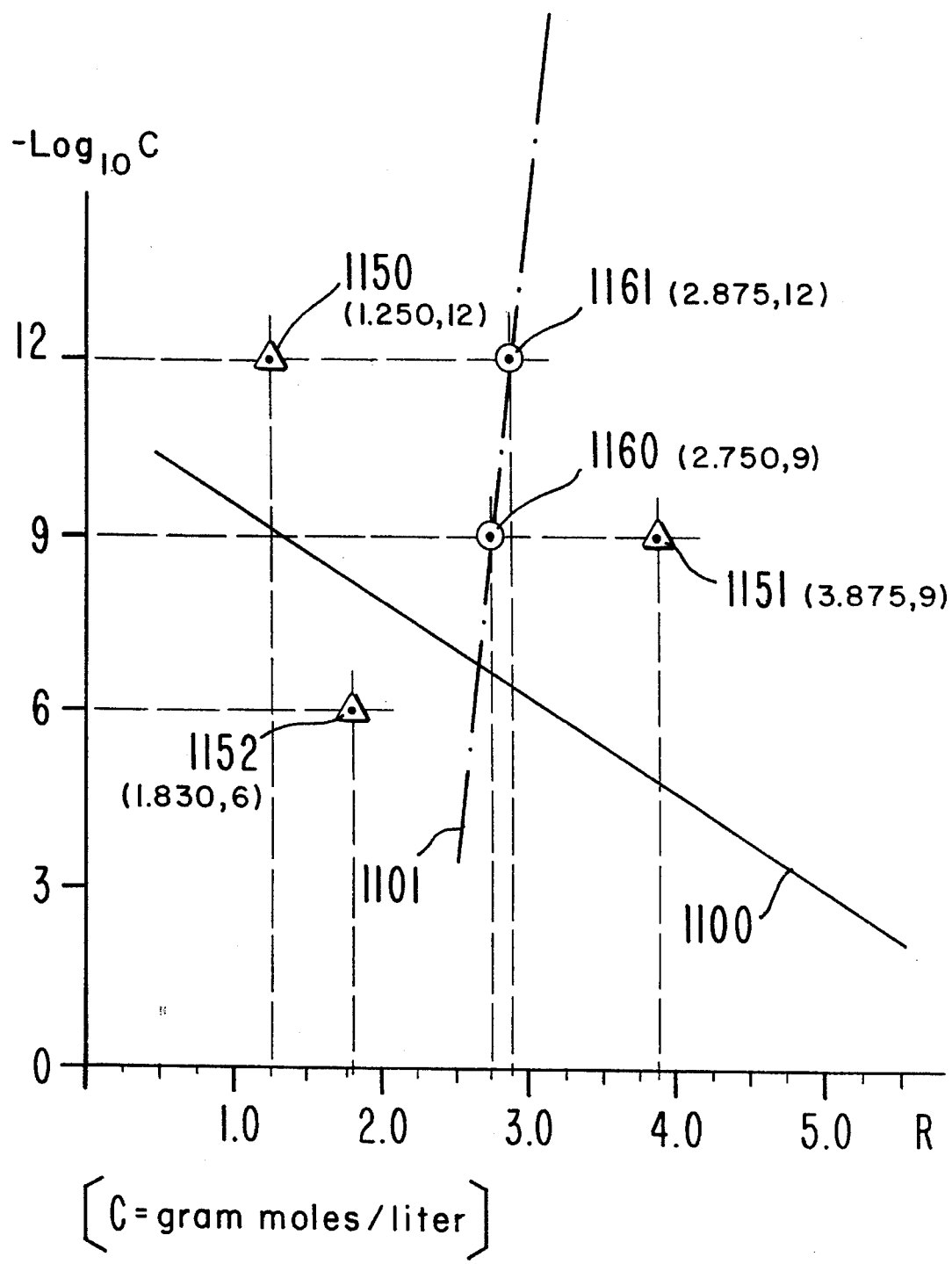

FIG. 11 is a graph of
$[-\log_{10}C]$
versus response, ("R") with $[-\log_{10}C]$ on the "Y" axis and ("R") on the "X" axis for the substances:
(a) 1-octen-3-ol having the structure:

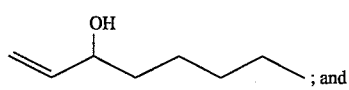

(b) guanidine having the structure:

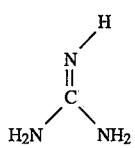

in the static tank testing apparatus against the species *Penaeus vannamei*.

Figure 12:
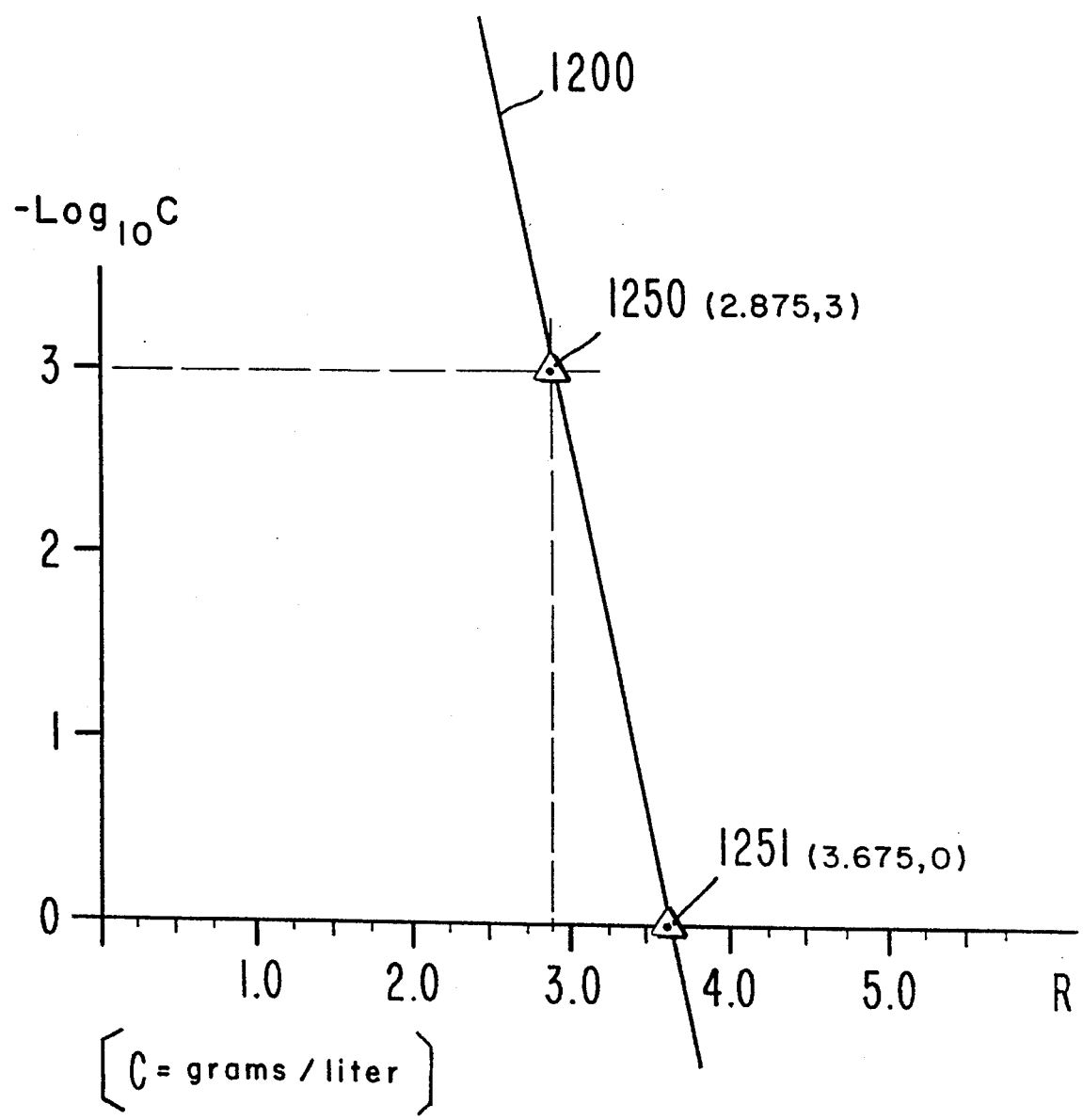

FIG. 12 is a graph of

[−log₁₀C]

of "C" once "Y" axis versus response ("R") on the "X" axis for TALIN® (mixture of Thaumatin I, Thaumatin II and Thaumatin B the liquid chromatograms for which are set forth in FIGS. 23 and 24 described, infra). The concentration is in grams per liter.

Figure 13:
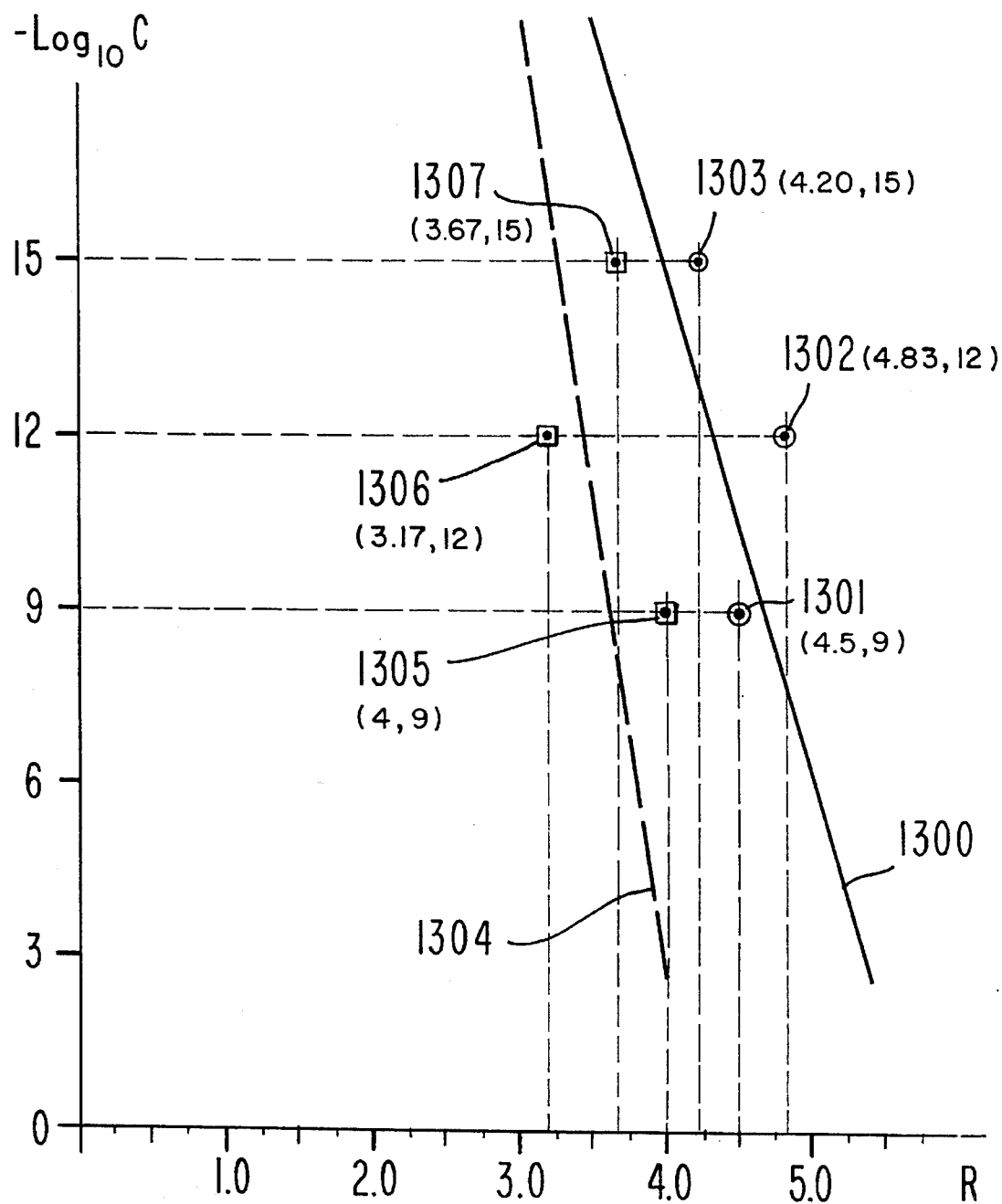

FIG. 13 is a graph of

[−log₁₀C]

on the "Y" axis versus response ("R") on the "X" axis for the substances:
 (a) dimethyl sulfoxide having the structure:

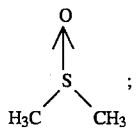

and
 (b) methional having the structure:

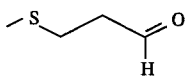

in the static tank nest apparatus of FIG. 2 as against the species *Penaeus vannamei*.

Figure 14:
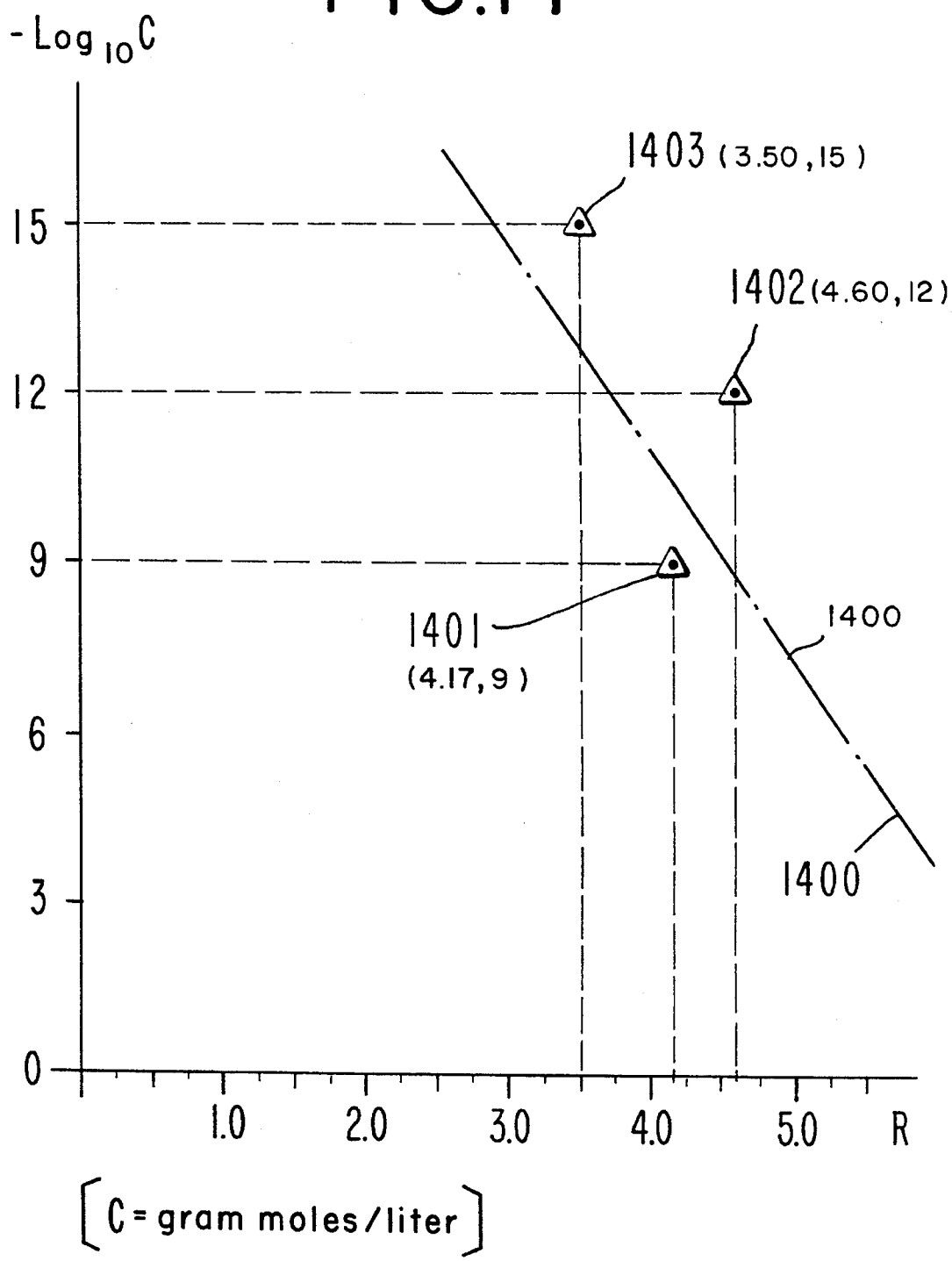

FIG. 14 is a graph of

[−log₁₀C]

on the "Y" axis versus response ("R") on the "X" axis for the substance:
 (a) 50:50 mole:mole mixture of skatole having the structure:

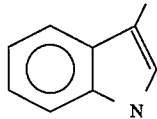

and indole having the structure:

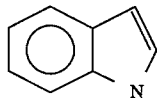

in the static tank test apparatus of FIG. 2 as against *Penaeus vannamei*.

Figure 15:
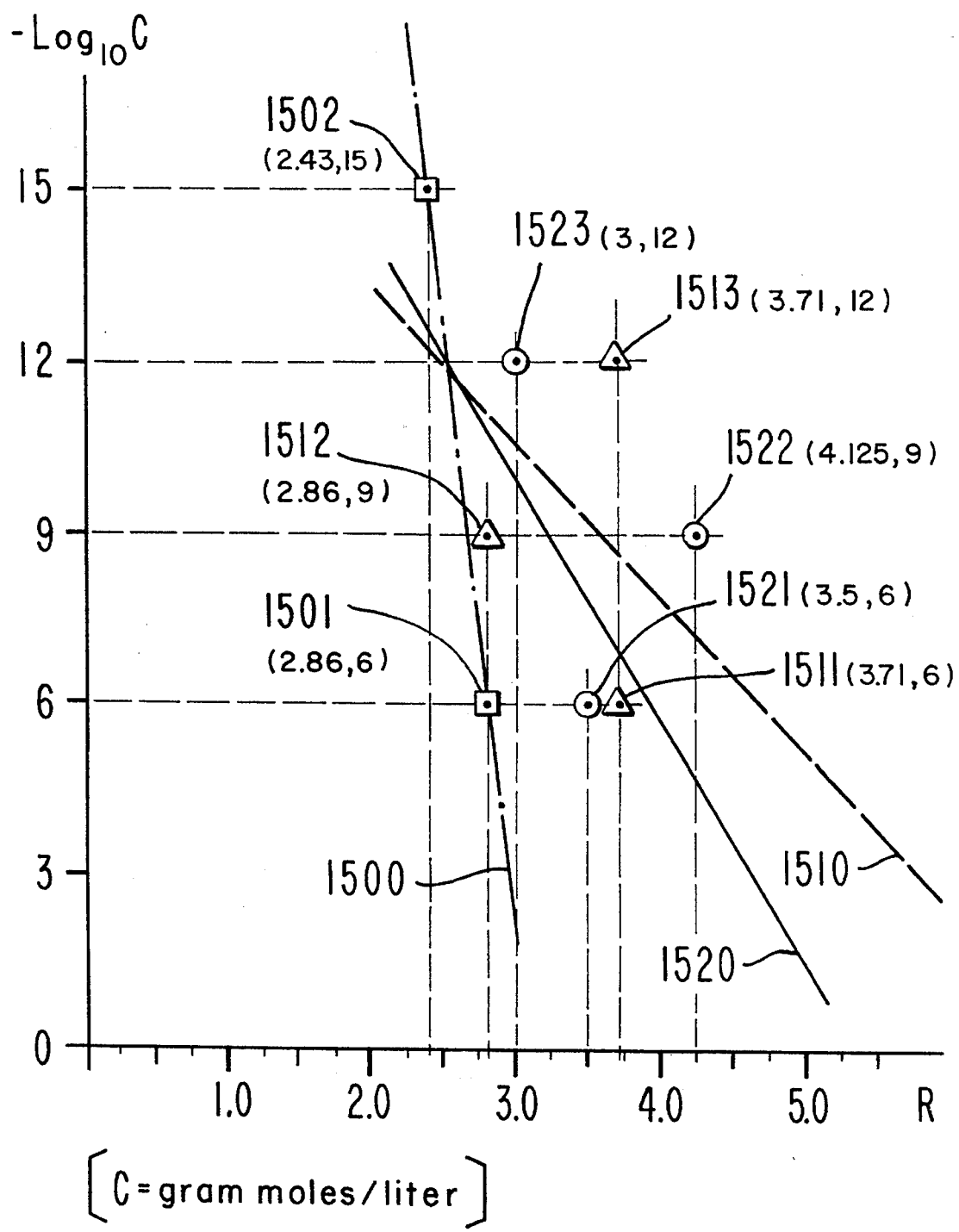

FIG. 15 is a graph of

[−log₁₀C]

on the "Y" axis versus response ("R") on the "X" axis for the substances:
 (a) ammonium chloride;
 (b) ammonia (aqueous); and
 (c) acetic acid
using the static tank nesting apparatus of FIG. 2 as against the species *Penaeus setiferus*.

Figure 16:
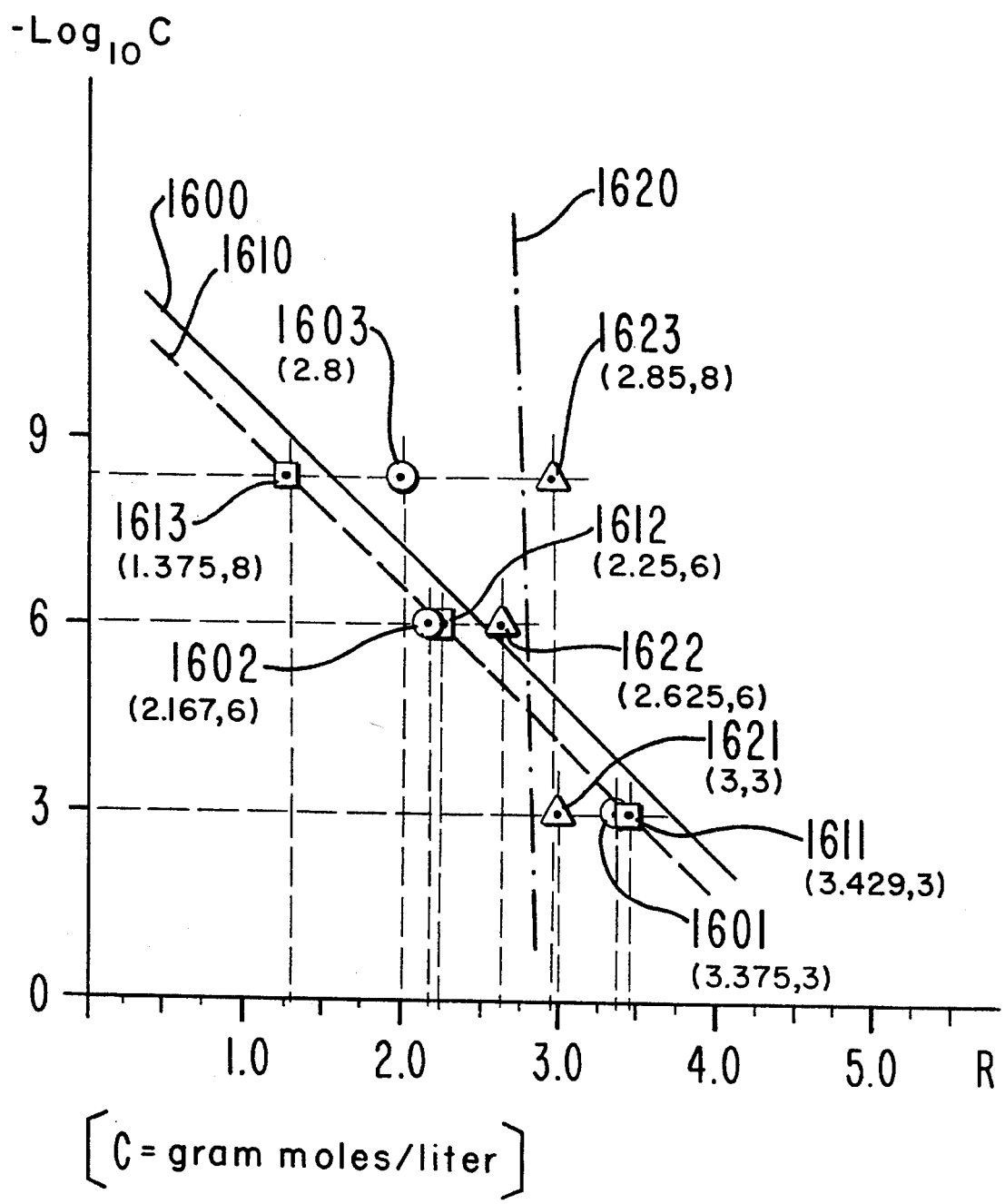

FIG. 16 is a graph of

[−log₁₀C]

on the "Y" axis versus response ("R") on the "X" axis for the substances:
 (a) glycine;
 (b) betaine having the structure:

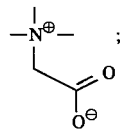

and
 (c) aspartate ion
in the static tank test apparatus as against the species *Penaeus setiferus*.

Figure 17:
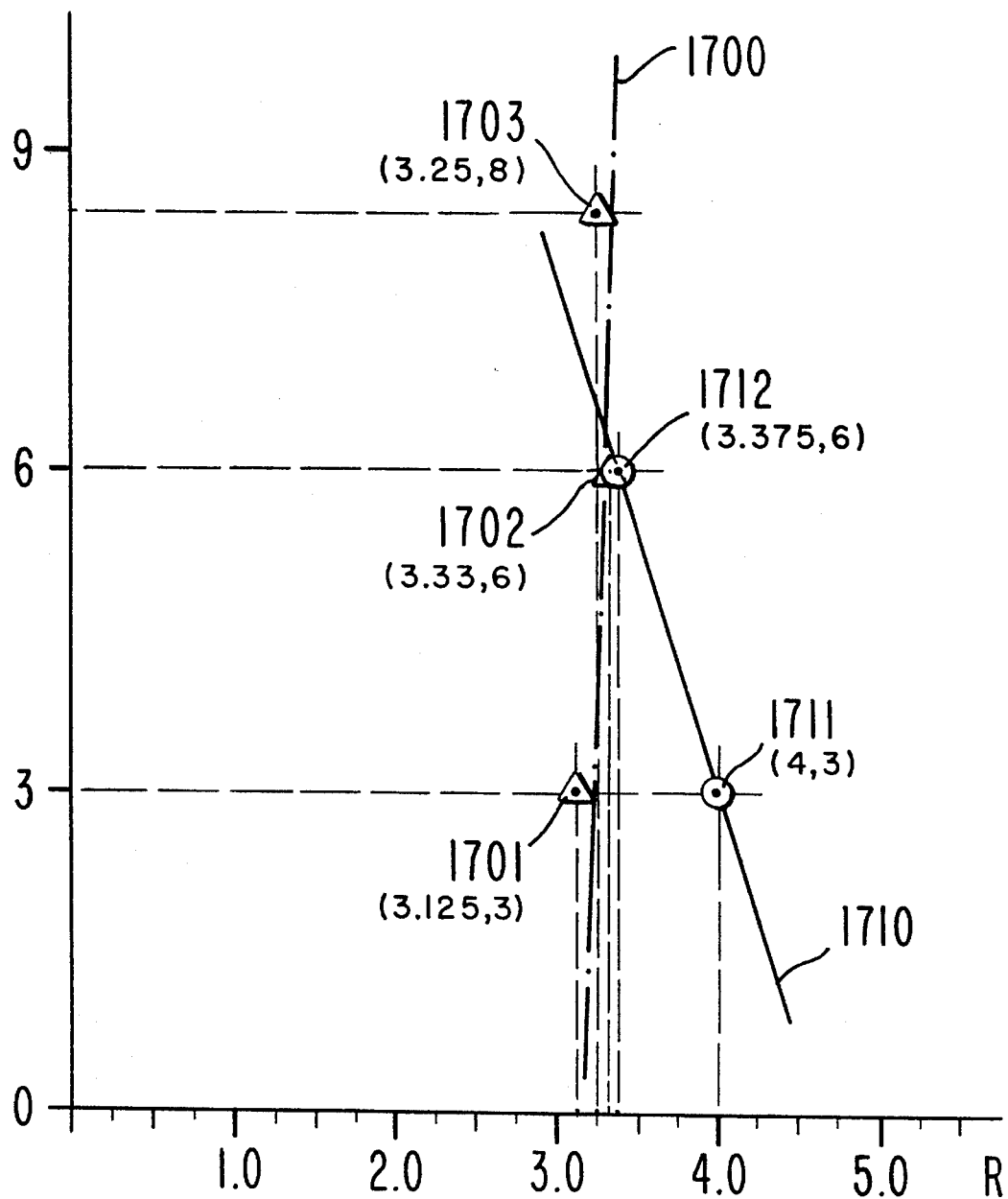

FIG. 17 is a graph of

[−log₁₀C]

on the "Y" axis versus response ("R") on the "X" axis for the substances:
 (a) glucose; and
 (b) taurine having the structure:

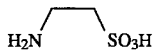

in the static tank testing apparatus as against *Penaeus setiferus*.

Figure 18:
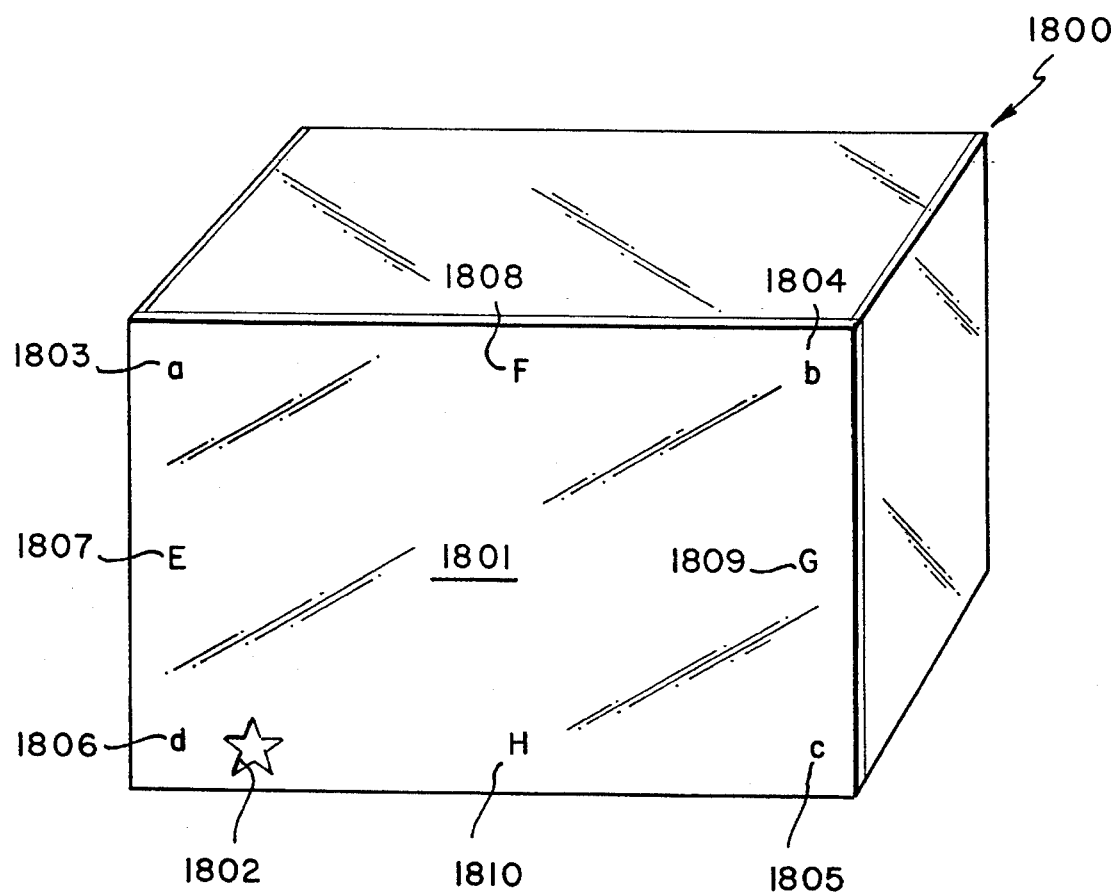

FIG. 18 is a schematic perspective diagram of the chemoreception test tank in the static tank apparatus of FIG. 2.

Figure 19:
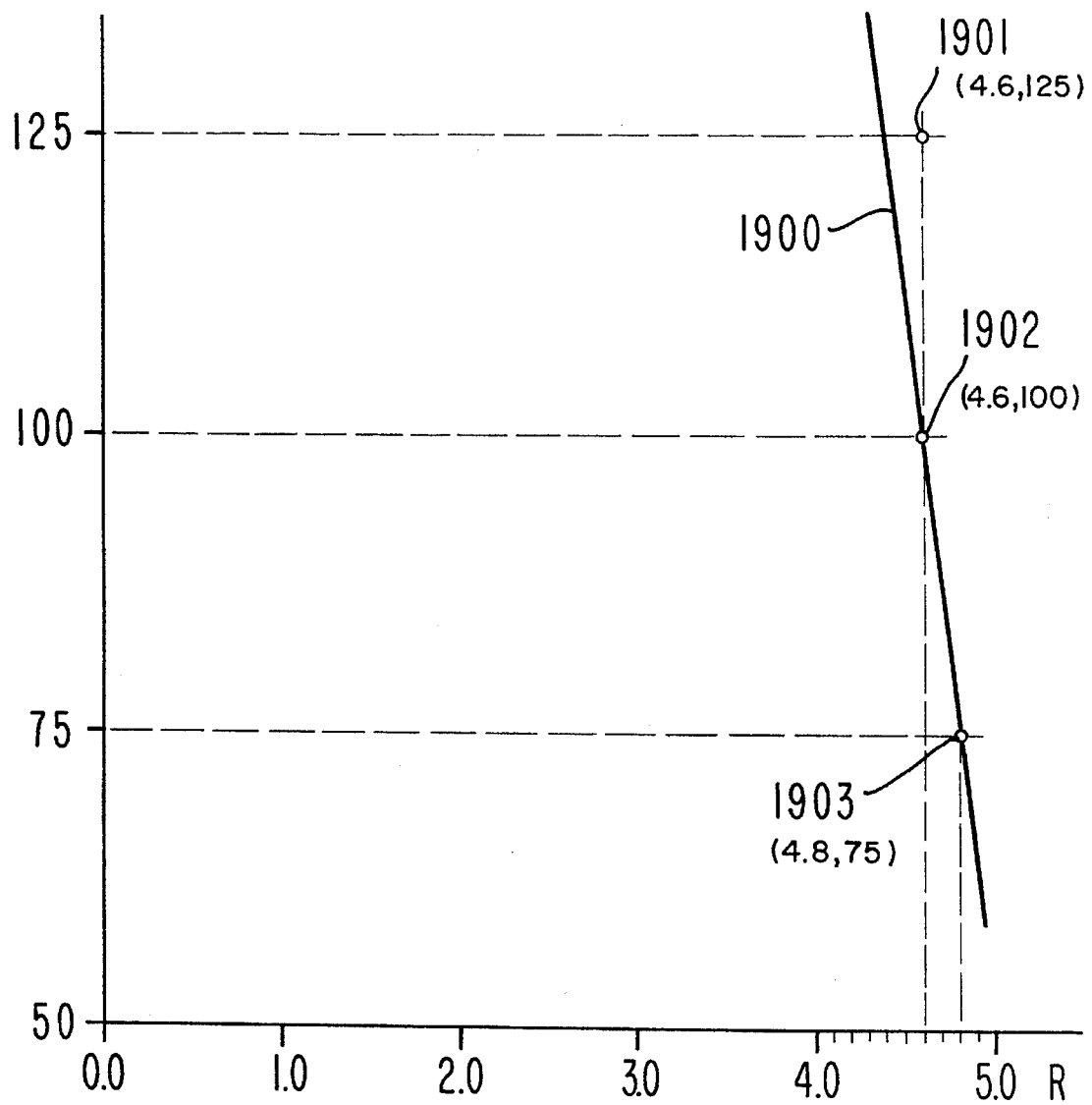

FIG. 19 is a graph of flow rate (ml per minute) on the "Y" axis versus response ("R") on the "X" axis for a mixture of glucose and "natural extract", a mixture of one part of equal portions of tissue of crab claw, squid mantle and shrimp abdomen in 1000 parts of "FRITZ®" Super Salt Concentrate, "synthetic sea salt" solution, 30 parts per thousand, described in detail, supra. The ratio of "natural" extract:super salt solution:glucose solution being 1:1000:1 (weight:weight:weight). The graph is for the use of the solution in the flow-through apparatus of FIG. 3 as against the species *Penaeus vannamei*.

Figure 20:
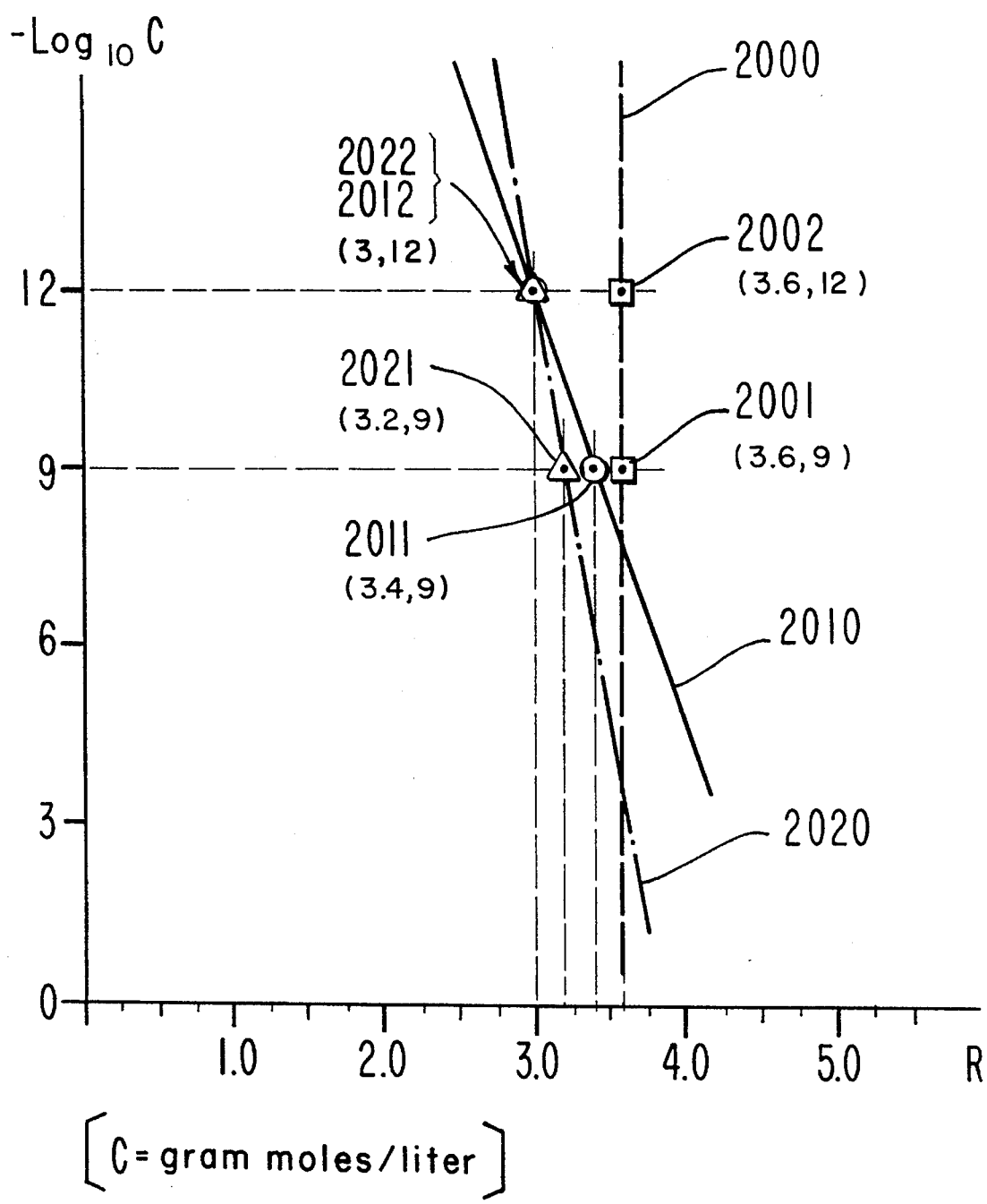

FIG. 20 is a graph of

[−log₁₀C]

(on the "Y" axis) versus response ("R") on the "X" axis for various flow rates at various concentrations of ammonium acetate use the flow-through apparatus of FIG. 3 for the species: *Penaeus vannamei*.

Figure 21:
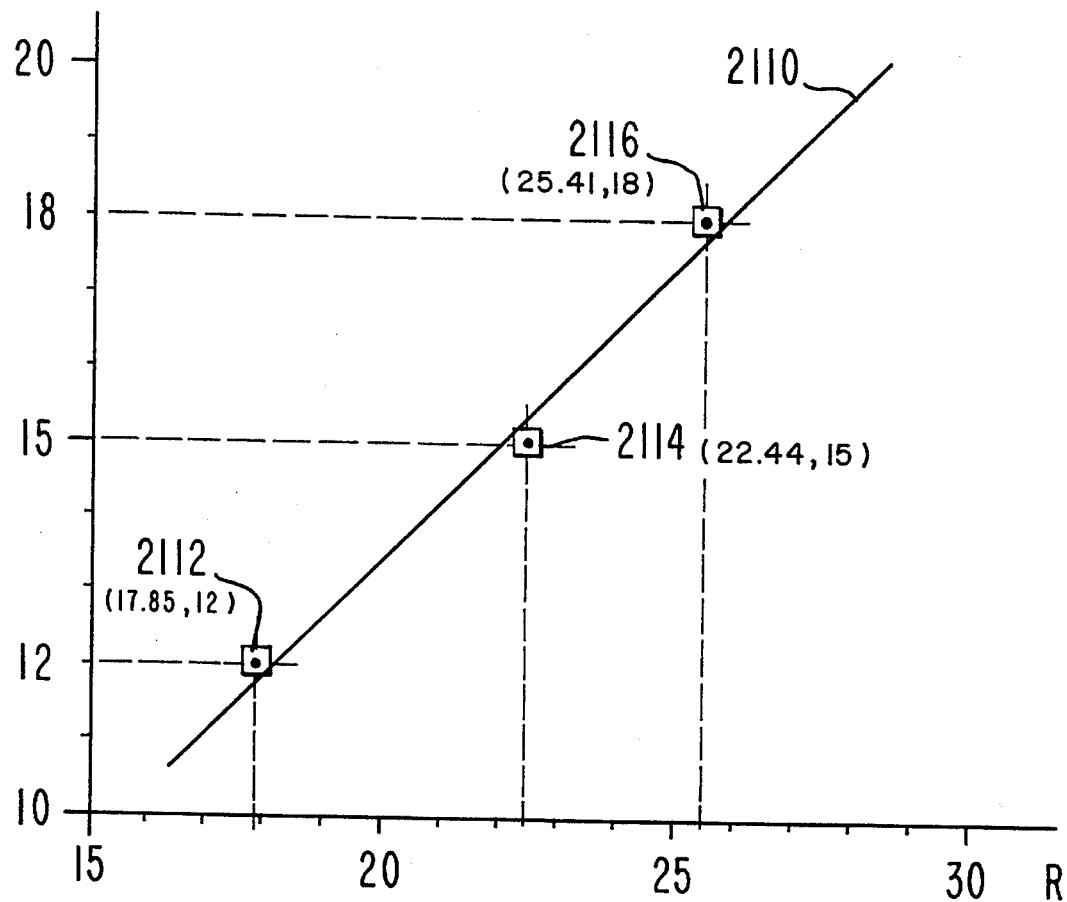

FIG. 21 is a graph of

[−log₁₀C]

(on the "Y" axis versus response ("R") on the "X" axis for the substance N-acetyl-alpha-D-Glucosamine, a mixture of compounds having the structures:

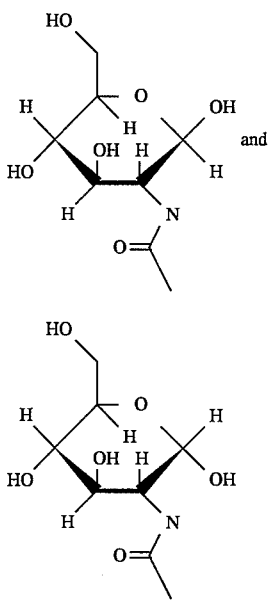

in the flow-through chamber testing apparatus of FIG. 3 as against *Penaeus vannamei*.

Figure 22:
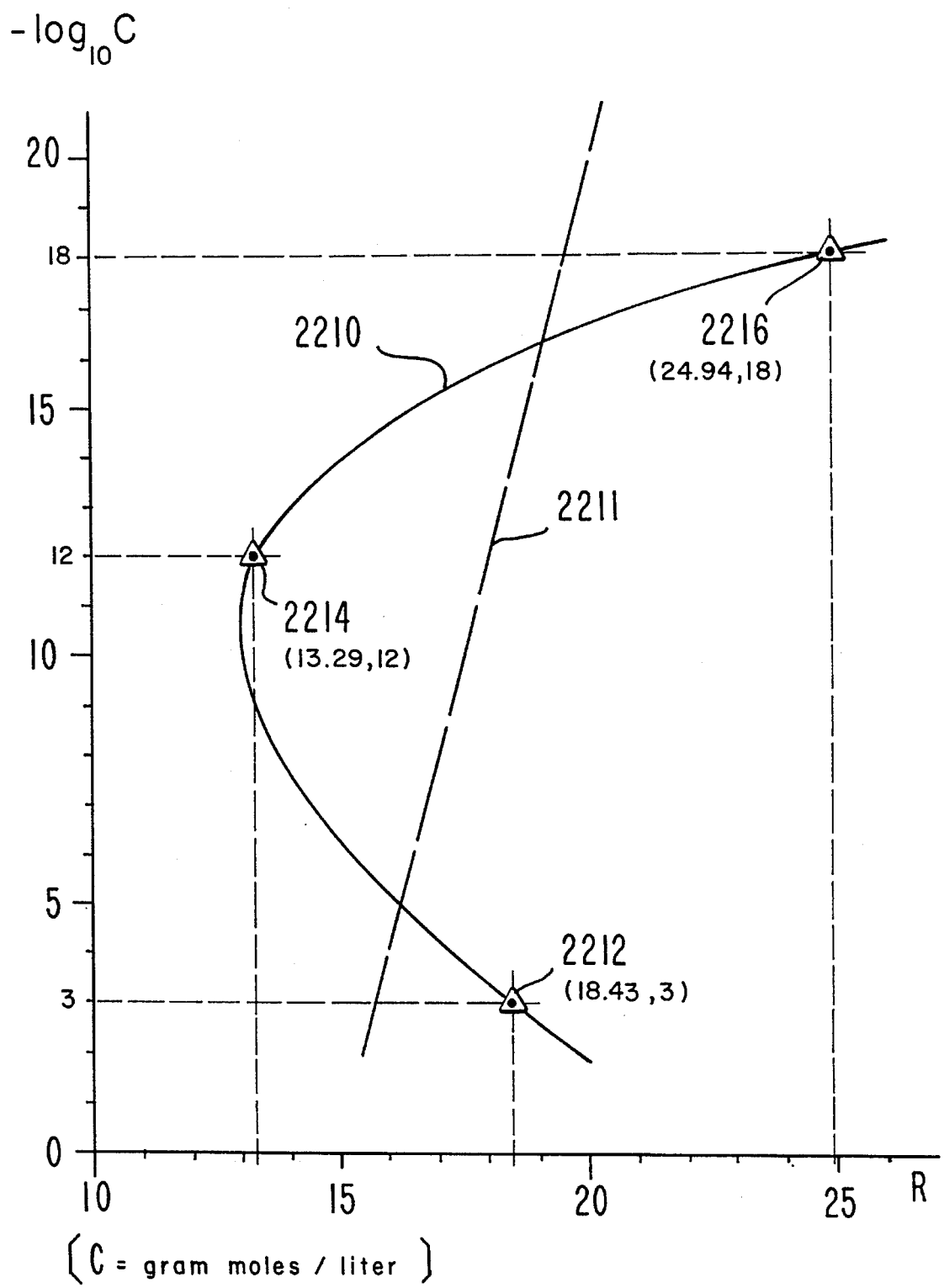

FIG. 22 is a graph of $$[-\log_{10} C]$$

on the "Y" axis versus response, ("R") on the "X" axis, with C being in gram moles per liter for the substance, methional having the structure:

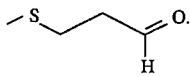

FIG. 23 is a liquid chromatogram profile for TALIN®, trademark of Tate and Lyle Limited of the United Kingdom, a mixture of Thaumatin I, Thaumatin II and Thaumatin B.

FIG. 24 is a HPLC (high pressure liquid chromatography) profile for TALIN®, the mixture of Thaumatin B, Thaumatin I and Thaumatin II, trademark of Tate and Lyle Limited of the United Kingdom.

DETAILED DESCRIPTION OF THE DRAWINGS

Referring to the cut-away schematic diagram of *Penaeus vannamei* species, the *Penaeus vannamei* is shown by reference numeral 10. Reference numeral 11a and 11b refer to the *Antennal flagellum*. Reference numeral 12 refers to the Antennular roedial flagellum. Reference numeral 13 refers to the Lateral antennular flagellum. Reference numeral 14 refers to the Antennal scale. Reference numeral 15a refers to a Dactyl of maxilliped the maxillipedes being indicated by reference numerals 15c, 15d and 15b. Reference numeral 16 refers to the Mandible, Maxillule and maxilla. Reference numerals 17e, 17f, 17g and 17h refer to Pereiopods. Reference numerals 17a and 17c refer to Dactyls of pereiopods. Reference numerals 17c and 17d refer to the Merus of pereiopods. Reference numerals 19a, 19b, 19c, 19d and 19e refer to the Pleopods. Reference numerals 20a and 20b refer to Uropods. Reference numeral 18 refers no the Branchial chamber of the *Penaeus vannamei*. Referring to the apparatus of FIG. 2, the static tank testing system, the static tank system is shown by reference numeral 200. Reference numeral 201 refers to the video monitor Reference numeral 203 is the vessel holding testing solution 202. Testing solution 202 is pumped through line 204a using peristaltic multihead pump 206 controlled by device 205 pumping solution 202 into tank 208. Tank 208 contains liquid 212 in which *Penaeus vannamei* or one of the members of the Penaeus genus of Crustacea 10 is swimming. The bottom of tank 208 is indicated by reference numeral 214 which may be entirely composed of a clear plastic or glass so that camera 210 may be focused on the movement of the member of the *Penaeus vannamei* genus of Crustacea 10 utilizing the fiber optic light generating device to 11. Tank 208 is mounted on stand 209 which surrounds the camera 210 directed towards the tank 208. The surface of the liquid 212 is shown by reference numeral 213. FIG. 2B is a side view of the apparatus of FIG. 2A with each of the reference numerals of FIG. 2A repeated.

FIG. 2C is merely a perspective view of the holding tank 208 showing the clear base 204 thereof. FIG. 2D is another side view of the apparatus of FIG. 2A with the reference numerals repeated.

An example of the light apparatus 211 is a Flexo Heavy-Duty Adjustable Lamp made by Art Specialty Company holding two 18" fluorescent tubes. The tubes are manufactured by the General Electric Company of Schenectady, N.Y. The following specifications for the tubes used are an example of what can be used in the operation of the apparatus of FIG. 2:

GE Catalog No. F15T8/CW

18" Cool White fluorescent tube

15 Watt

Rated life of 7500 hours

Initial lumens=825

Mean lumens=725

Kelvin temperature=4150

CRI rating of 62.

The peristaltic pump utilizable are those, for example, identified as MASTERFLEX® manufactured by the Cole-Parmer Instrument Company of 7425 North Oak Park Avenue, Chicago, Ill. 60648 (MASTERFLEX® being a trademark owned by Cole-Parmer Instrument Company). The pump head is a L/S QUICK LOAD® pump head (trademark of Cole-Parmer Instrument Company). An example of the MASTERFLEX® tubing utilized with the MASTERFLEX® tubing pump (peristaltic pump) is C-FLEX® 06424 (trademark of Cole-Parmer Instrument Company), a styrene-ethylene-butylene modified block copolymer.

Referring to FIG. 3, the flow-through vessel testing apparatus, fluid to be tested, 302 is contained in container 303 and pumped through tube 304a using pump 306a and then through tube 304b into location 325 and then into vessel 350. Vessel 350 contains the member of the Penaeus genus of Crustacea 10' and 10" located in the flowing liquid 312. Meanwhile the liquid 312 is circulating by means of pump 306b through line 324a and then through line 324b into tube 326a and fitting 331a where it joins with the feeding fluid (test material) at 325. The combined liquids having ever-increasing concentration of material in vessel 303 travels through holding vessel 350 past screen 330 into exit tube 331b past fitting 329 into tube 326b where again it is recirculated. The exit portion of the flow-through tank is 351b and the entrance portion is 351a. Meanwhile the motions of the member of the Penaeus genus of the Crustacea 10' and 10" is recorded using video camera 310 shown on monitor 301. Simultaneously, light source 311 directs light into flow-through vessel 350. The base of the flow-through vessel has a clear plate through which camera 310 has a direction of vision. Screen 330 is held in place at 335. Screen 330 divides the flow-through tank between sections 351a, the entrance section and 351b, the exit section. As shown in FIGS. 3A, 3B and 3C, fluid entering the flow-through holding tank 350 enters from tube 352a and exits from tube 352b. Additional testing fluid enters through tube 304b and enters the elbow mixing with fluid from 326a at 331a. Fitting 326a is threaded into elbow 325 at 329. Fluid exits at 352b entering elbow 331b. Fitting 326b is threaded into the elbow at 329.

Referring to FIG. 4, FIG. 4 shows a side elevation view partially cut-away of apparatus showing in detail the variable focus camera, camera platform and shield set up used with the light in conjunction with the test chamber. Chamber 408 could be a flow-through chamber containing fluid 412 therein. Light source 411 emits visible wave length radiation into the tank 408 and into the fluid 412 simultaneously with the action of video camera 410 strapped to platform 414 with strap 421. Video camera 410 is mounted on a height adjuster 452 having a movable height adjustment screw 413 and movement bearings 430 at runways indicated by 415a and 415b set into platform top 416. The camera is mounted so that the lens and the liquid 412 are on a direct visual line as a result of an orifice in supporting frame 419 and in shield 417, the orifice being indicated by reference numeral 418. Supporting frame 419 and the camera are shielded by cloth 420 which prevents unwanted reflection back into the camera. Thus, camera 410 may be adjusted laterally and vertically, the vertical adjustment coming through the use of adjustment screw 413 and the lateral travel coming through the travel using bearings 430 in the defined travel paths 415a and 415b.

FIG. 4A is a detailed section of the shield 417 having attached thereto a light shield and light guide 422 at an angle of 45° to the shield 417. 418 Indicates the orifice mentioned in the detailed description of FIG. 4. FIG. 4B is a front view of the frame of FIG. 4A showing the orifice 418 and the light shield 422 and the vertical part of the frame 417. FIG. 4C is another side elevation view of the camera platform showing via hidden lines the adjustable camera mount platform 452 and the hinge to which the adjustable mount 452 is connected to the frame, the hinge being indicated by reference numeral 450.

FIG. 4D is the front view of the camera platform looking in the direction of the camera from the flow-through tank. The cloth cover 420 is connected via a frame 419 to a main cover 417. The orifice in the cloth 420 is indicated by reference numeral 418a.

FIG. 4E is a top view of the camera platform showing the adjustable platform 452 and the adjustable screws 413 with hinges 450 and showing the location of the inner frame 419.

FIG. 5A is a top cut-away view of a Y-maze apparatus for testing attractancy of a substance. The Y-maze apparatus is indicated in general by reference numeral 500. The member of the Penaeus genus of Crustacea 10 may or may not be attracted to an attractant or it may or may not be excited by an excitant. In any event, the feedline 560 is located at the end of the Y-maze 509a; and nothing is located at the adjacent divergent end of the Y-maze 509b (the "control" section). Thus, the feeding section of the Y-maze is indicated by 509a and the control section is indicated by 509b. Both sections join at 540 with a joining wall 543. The side walls of the feeding section of the Y-maze apparatus are indicated by 542 and the side walls of the control section are indicated by reference numeral 541. The control section and the feeding section are at an angle "alpha" from one another. The vertex of the angle is at reference numeral 540. Optional feeding station also exists in the Y-maze feeding section and is indicated by reference numeral 596. Baffle plates 501a, 501b, 501c and 501d (also called "flow screens") are located close to the end 509a and close to the feeding line 560 coming from the feeding fluid peristaltic pump. The feeding section overall is indicated by reference numeral 520 and the control section overall is indicated by reference numeral 521. The feeding section and the control section are separated by a removable screen 503 from the main section of the Y-maze 522 in which the member of the Penaeus genus of Crustacea 10 is located. The sides of the main section 522 are indicated by reference numerals 508a and 508b. The back end of the Y-maze which is in the shape of a rectangular parallelepiped contains a recirculation line 562a and a drain 562b, the back section being indicated by reference numeral 526. A baffle between the back section 526 and main section of the Y-maze 522 is indicated by reference numeral 590 having a right angle bend to section portion 591. The flow of liquid travels through portal 570 underneath baffle 590 and around baffle 524 to either recirculation section or to the drain. The flush port indicated in the side view FIG. 5B is indicated by reference numeral 561. The fluid level also shown in the side view in FIG. 5B is indicated by reference numral 513. The handle by which screen 504 may be removed is indicated by reference numeral 503.

FIGS. 5C and 5D show yet another embodiment of the Y-maze apparatus test tank of our invention. In this case, the baffle 590 is replaced by a curved baffle 590a. The embodiments of FIGS. 5C and 5D are indicated, overall, by reference numeral 510.

FIGS. 5E and 5F show yet another embodiment of the Y-maze apparatus of our invention, indicated by reference numeral 520. In this case the baffles 590 and 590a are replaced by baffles 591a and 592a which contain screen 593 and 594 which is removable. The screen itself is indicated by reference numeral 593 and the holes in the screens are indicated by reference numeral 594. Fluid moves past the screen 593 and through portal 570 around baffle 524 in exiting from the Y-maze.

FIG. 6 sets forth a Y-maze built particularly for Star Fish of the prior art (Castilla, Marine Biology, Volume 12, pages 222–228, (1972) "Responses of *Asterias rubens* to Bivalve prey in a Y-maze". The apparatus indicated by reference numeral 600 is the prior art Y-maze apparatus of the Castilla article shown on page 222 thereof.

Figure 1:
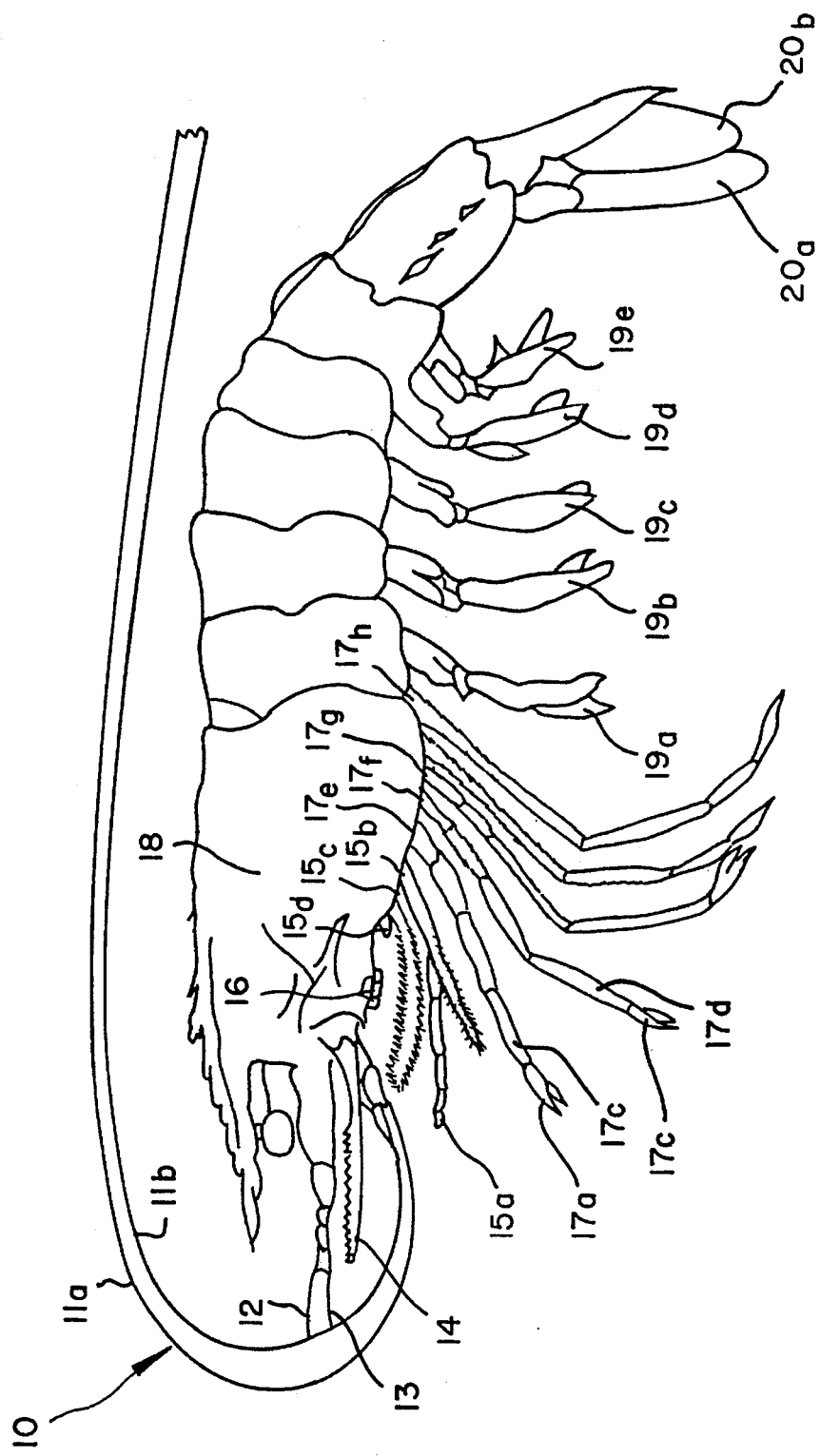
FIG. 1 is a schematic side elevation diagram of *Penaeus vannamei*, Pacific White Shrimp, farm reared species, showing the various locations of various chemoreceptors.
Figure 7:
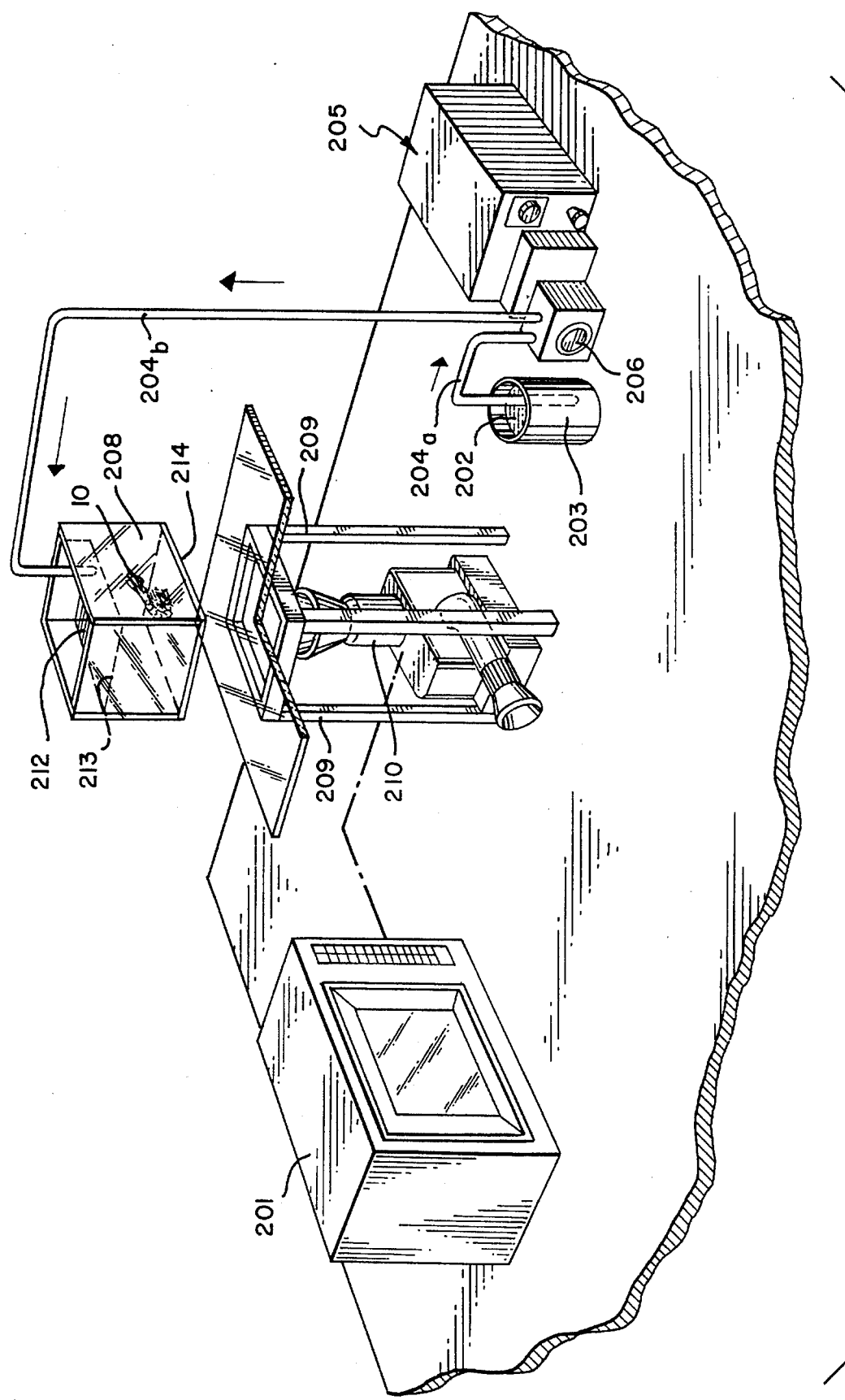
FIG. 7 is a perspective view of the static tank testing apparatus of our invention shown in FIG. 2.

FIG. 7 is a perspective diagramatic view of the apparatus of FIG. 2. FIG. 7A is a perspective view in diagramatic form of the apparatus of FIG. 3 incorporating FIGS. 3A, 3B, and 3C.

With respect to each of the figures showing the video camera described, supra, a useful video camera is the SONY® Video Camera Recorder Hi8, Model CCD-TR101 (Video Hi8 "Handycam").

FIG. 8 sets forth a graph showing the response "R" on the "Y" axis versus $$[-\log_{10} C]$$

(with C being in gram moles per liter) for N-acetyl-alpha-D-Glucosamine, a mixture of compounds having the structures:

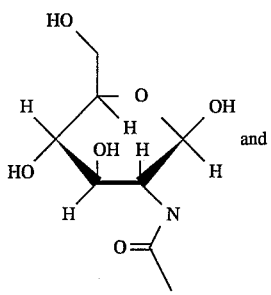

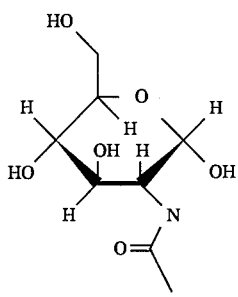

The graph indicated by reference numeral 800 is a regression graph drawn through each of the four points which are data points 801, 802, 803 and 804.

By the same token, in FIG. 9 the graph of $[-\log_{10}C]$ versus "R" is for the materials TALIN® (shown by regression graph 901 using data points 959, 960 and 961); S-methyl methionine sulfonium chloride having the structure:

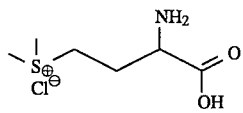

(using regression graph 902 and data points 962, 963 and 966); and alpha-D-Glucosamine, a mixture of compounds having the structures:

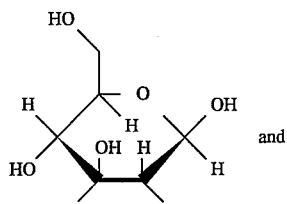

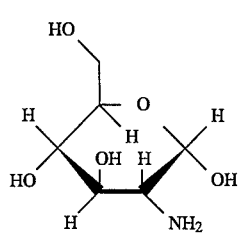

(using regression graph 900 and data points 950 and 951).
By the same token in FIG. 10, the graph of $[-\log_{10}C]$ versus response "R" is for two materials, propiothetin (bromide) having the structure:

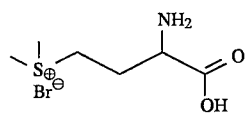

(shown by regression graph 1002 and data points 1060, 1061 and 1062) and trimethyl amine oxide hydrate having the structure:

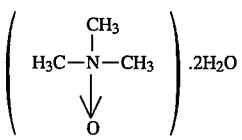

(shown by regression graph 1000 and data points 1050 and 1051).

By the same token FIG. 11 shows a graph of $[-\log_{10}C]$ versus response for use in the static test tank of FIG. 2 for the species *Penaeus* vannamei for 1-octen-3-ol having the structure:

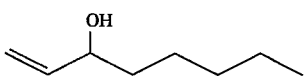

(shown by regression graph 1100 and data points 1150, 1152 and 1161) and for guanidine having the structure:

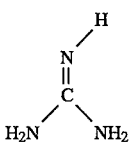

(shown by regression graph 1101 and data points 1160 and 1161).

By the same token FIG. 12 is a graph of $[-\log_{10}C]$ (with C in grams per liter) versus "R" for TALIN®. The graph indicated by reference numeral 1200 is a graph for a straight line of $[-\log_{10}C]$ versus "R" directly through data points 1250 and 1251.
By the same token FIG. 13, the graph of $[-\log_{10}C]$ versus "R" is for two materials:dimethyl sulfoxide having the structure:

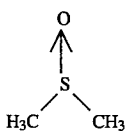

(indicated by the regression graph 1304 and the data points 1305, 1306 and 1307) and for methional having the structure:

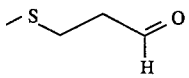

(indicated by regression graph 1300 and data points 1301, 1302 and 1303).

By the same token the graph of FIG. 14 of $[-\log_{10}C]$ versus "R" is for the material, a 50:50 mole:mole mixture of skatole having the structure:

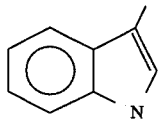

and indole having the structure:

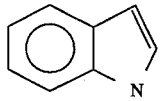

(with regression graph 1400 and data points 1401, 1402 and 1403).

The graph of FIG. 15 is also for $[-\log_{10}C]$ versus "R" (response) for three materials for the species, *Penaeus setiferus* tested in a static holding tank. The graph indicated by reference numeral 1500 is a straight line directly through data points 1501 and 1502 and is for aqueous ammonia. The graph indicated by reference numeral 1510 is a regression graph for acetic acid, and its data points are indicated by reference numerals 1511, 1512 and 1513.

The graph indicated by reference numeral 1520 is a regression graph for aqueous ammonium chloride and its data points are indicated by reference numerals 1521, 1522 and 1523.

By the same token, FIG. 16 is a graph of $[-\log_{10}C]$ versus response ("R") using a static holding tank testing apparatus and involving the species *Penaeus setiferus* for the substances betaine having the structure:

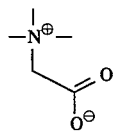

(indicated by the regression graph 1610 and the data points 1611, 1612 and 1613); glycine (indicated by the regression graph 1600 and the data points 1601, 1602 and 1603); and for aspartate ion (sodium aspartane in solution; indicated by regression graph 1620 and data points 1621, 1622 and 1623).

By the same token, FIG. 17 is a graph of $[-\log_{10}C]$ versus response ("R") using the static holding tank apparatus of FIG. 2 involving the species *Penaeus setiferus*. The graph indicated by reference numeral 1710 is for aqueous glucose and is a straight line through data points 1711 and 1712. Graph 1700 is a regression graph for taurine having the structure:

through data points 1701, 1702 and 1703.

A chemoreception static test tank embodiment is set forth in the illustration in FIG. 18, in perspective. Various locations at the bottom of test tank 1800 (with the bottom indicated by reference numeral 1801) are set forth in the test tank for reference purposes. Point "A" is indicated by reference numeral 1803. Point "b" is indicated by reference numeral 1804. Point "c" is indicated by reference numeral 1805. Point "d" is indicated by reference numeral 1806. Point "E" is indicated by reference numeral 1807. Point "F" is indicated by reference numeral 1808. Point "G" is indicated by reference numeral 1809. Point "H" is indicated by reference numeral 1810. The buret insertion hole in the bottom of the tank is indicated by reference numeral 1802. The member of the Penaeus genus of Crustacea will move from location "b" towards any of the other locations over a given period of time with a given feed inserted at 1802. That movement is recorded and is a function of the grade "G" or "response", "R" for the particular feeding material at the particular concentration involved inserted at buret insertion 1802.

A graph of flow rate (in ml per minute) versus response for the material: "glucose+natural extract+salt water" (described, supra) is indicated by regression graph 1900 using data points 1901, 1902 and 1903.

FIG. 20 sets forth three graphs for aqueous ammonium acetate of $[-\log_{10}C]$ versus response, "R" for three different flow rates The graph indicated by reference numeral 2000 is for a flow rate of 125 ml/min. and is a straight line through data points 2001 and 2002. The graph or a flow rate of 100 ml/min. is indicated by reference numeral 2020 and is a straight line through data points 2021 and 2022. The graph indicated by reference numeral 2010 is for a flow rate of 75 ml/min. and is a straight line through data points 2011 and 2012.

FIG. 20 is for data obtained using the flow-through tank apparatus of FIG. 3. The species tested is *Penaeus setiferus*.

Referring to the graph of FIG. 21, for $$[-\log_{10} C]$$

versus response for N-acetyl-alpha-D-Glucosamine, a mixture of compounds having the structures:

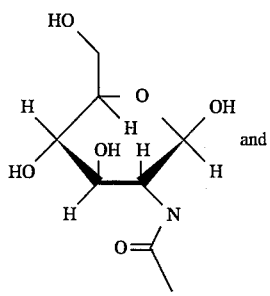

and

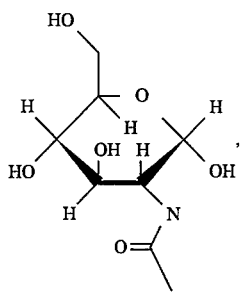

the regression graph, a straight line is indicated by reference numeral 2110; and the data points for said regression graph are indicated by reference numerals 2112, 2114 and 2116. The flow-through tank is that set forth in FIG. 2 described, supra, and the species tested is *Penaeus vannamei*.

FIG. 22, showing the relationship of $$[-\log_{10} C]$$

versus response ("R") shows two different regression graphs using three data points, 2212, 2214 and 2216 for methional having the structure:

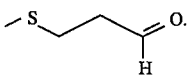

The regression graph indicated by reference numeral 2210 is in the shape of a hyperbola. The regression graph indicated by reference numeral 2211 is for a straight line. The apparatus used again is the flow-through apparatus of FIG. 3 and the species involved is *Penaeus vannamei*.

Table I below sets forth mean response versus number of species of *Penaeus vannamei* in the group versus the particular chemical involved and its concentration. Table I is as follows:

TABLE I

| Chemical and Concentration | Number of Species In Group | Average Response Using the Mathematical Model: $G_2 = 100 - 10\Theta$ |
|---|---|---|
| " "(solution of FRITZ ® salt in water, 35 ppt) | 16 | 5.82 |

TABLE I-continued

| Chemical and Concentration | Number of Species In Group | Average Response Using the Mathematical Model: $G_2 = 100 - 10\Theta$ |
|---|---|---|
| Natural Extract; Glucose at $10^{-3}$M | 8 | 17.33 |
| N-acetyl-alpha-D-Glucosamine at a concentration of $10^{-12}$M in 35 ppt aqueous FRITZ ® salt solution | 8 | 17.85 |
| N-acetyl-alpha-D-Glucosamine at a concentration of $10^{-15}$M in 35 ppt aqueous FRITZ ® salt solution | 8 | 22.44 |
| N-acetyl-alpha-D-Glucosamine at a concentration of $10^{-18}$M in 35 ppt aqueous FRITZ ® salt solution | 8 | 25.41 |
| Propiothetin (Bromide) at $10^{-9}$M in aqueous solution of FRITZ ® salt solution at 35 ppt | 7 | 2.89 |
| S-Methyl methionine sulfonium chloride at $10^{-9}$M (in aqueous FRITZ ® salt solution at 35 ppt) | 8 | 7.69 |
| TALIN ® at $10^{-5}$mg/L (of aqueous FRITZ ® salt solution at 35 ppt) | 8 | 27.28 |
| Trimethyl amine oxide hydrate at $10^{-9}$M (in aqueous FRITZ ® salt solution at 35 ppt) | 7 | 19.72 |
| TASTONE ® 900 (Bakers Yeast extract, spray-dried manufactured by the Red Star Specialty Products Inc. of 433 East Michigan Street, Milwaukee, Wisconsin 53202) (10 mg/l of FRITZ ® salt solution at 35 ppt) | 8 | 20.20 |
| Methional at $10^{-3}$M (in aqueous FRITZ ® salt solution at 5 ppt) | 8 | 18.43 |
| Methional at $10^{-12}$M (in aqueous FRITZ ® salt solution at 5 ppt) | 8 | 13.29 |
| Methional at $10^{-15}$M (in aqueous FRITZ ® salt solution at 5 ppt) | 7 | 24.94 |
| Dimethyl Sulfoxide at $10^{-9}$M (in | 8 | 43.40 |

TABLE I-continued

| Chemical and Concentration | Number of Species In Group | Average Response Using the Mathematical Model: $G_2 = 100 - 10\Theta$ |
|---|---|---|
| aqueous FRITZ® (salt solution at 35 ppt) | | |

Note:
The aqueous FRITZ® salt, described in detail, supra, is at a level in water of 35 parts per thousand in each of the compositions set forth in Table I.

FIG. 23 is a liquid chromatogram profile for TALIN® (trademark of Tate and Lyle Limited of the United Kingdom), a mixture of Thaumatin I, Thaumatin II and Thaumatin B. (Conditions: S-Sepharose column operating at 7 ml per minute; gradeant: 0–250 mM NaCl (2×750 ml) fraction size: 45 ml). The peak indicated by reference numeral 2316 is for that part of TALIN® which is known as "Thaumatin I" as described in U.S. Pat. No. 5,221,624 issued on Jun. 22, 1993 the specification for which is incorporated by reference herein. The Thaumatin I can also be shown using the symbolism:

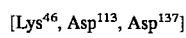

where "Lys" stands for a "lysine" moiety; and "Asp" stands for an "Aspartic acid" moiety. The peaks indicated by reference numerals 2312 and 2314 are for "Thaumatin B" and "Thaumatin II" as described in U.S. Pat. No. 4,771,000 the specification for which is incorporated by reference herein.

FIG. 24 is the high pressure liquid chromatography profile for the same TALIN® as set forth concerning the description of FIG. 23.

What is claimed is:

1. A process for attracting a member of the Penaeus genus of Crustacea from a volume of water inhabited by said member of the Penaeus genus of Crustacea to a desired surface or volume within a body of water comprising the step of applying an aqueous solution containing a Crustacea-attracting concentration of a material selected from the group consisting of:

(i) N-acetyl-alpha-D-Glucosamine, a mixture of compounds having the structures:

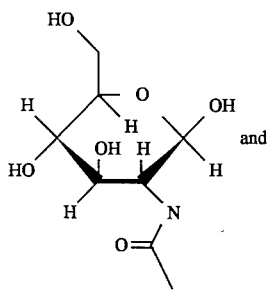

and

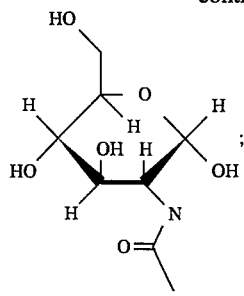

(ii) S-Methyl methionine sulfonium chloride having the structure:

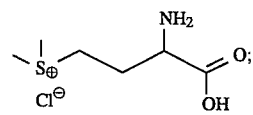

(iii) trimethyl amine oxide hydrate having the structure:

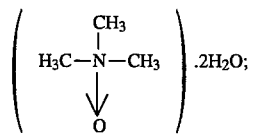

(iv) 1-octen-3-ol having the structure:

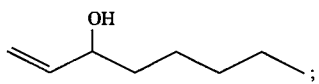

(v) methional having the structure:

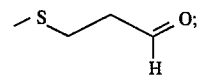

(vi) dimethyl sulfoxide having the structure:

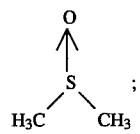

(vii) a 50:50 (mole:mole) mixture of skatole having the structure:

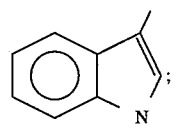

and
indole having the structure:

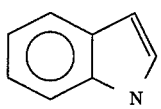

and (viii) propionthenin (bromide) having the structure:

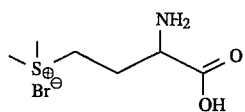

to the vicinity of said desired surface or volume.

2. The process of claim 1 wherein the Crustacean attracting material is N-acetyl-alpha-D-Glucosamine, a mixture of compounds having the structures:

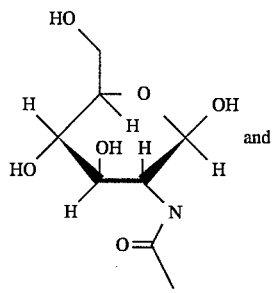

3. The process of claim 1 wherein the Crustacean attracting material is 1-octen-3-ol having the structure:

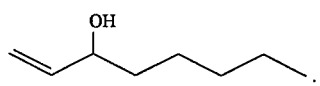

4. The process of claim 1 wherein the Crustacean-attracting material is methional having the structure:

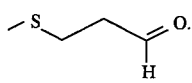

5. The process of claim 1 wherein the Crustacean-attracting material is trimethyl amine oxide hydrate having the structrure:

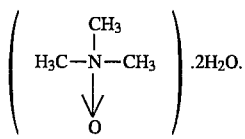

6. A process for exciting a member of the Penaeus genus of Crustacea within a volume of water inhabited by said member of the Penaeus genus of Crustacea comprising the step of applying an aqueous solution containing a Crustacea exciting concentration of a material selected from the group consisting of:

(i) N-acetyl-alpha-D-Glucosamine, a mixture of compounds having the structures:

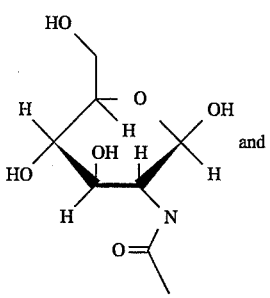

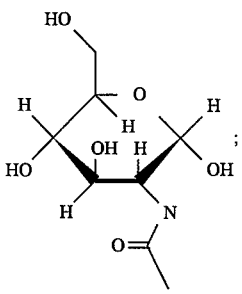

(ii) S-Methyl methionine sulfonium chloride having the structure:

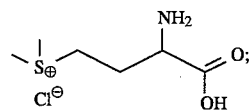

(iii) trimethyl amine oxide hydrate having the structure:

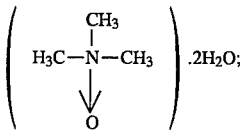

(iv) 1-octen-3-ol having the structure:

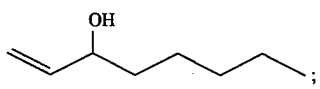

(v) methional having the structure:

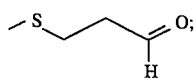

(vi) dimethyl sulfoxide having the structure:

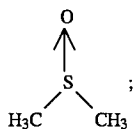

(vii) a 50:50 (mole:mole) mixture of skatole having the structure:

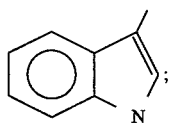

and
indole having the structure:

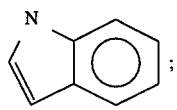

and
(viii) propionthetin (bromide) having the structure:

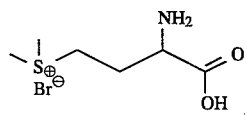

to the vicinity of said desired surface or volume inhabited by said member of the Penaeus genus of Crustacea.

7. The process of claim 6 wherein the Crustacean exciting material is N-acetyl-alpha-D-Glucosamine, a mixture of compounds having the structures:

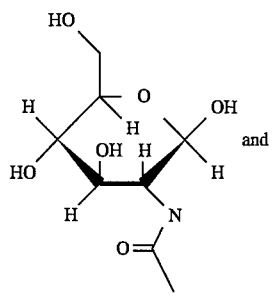

and

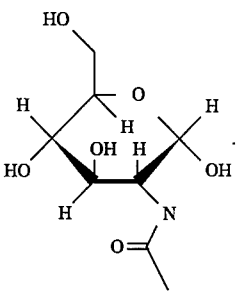

8. The process of claim 6 wherein the Crustacean exciting material is 1-octen-3-ol having the structure:

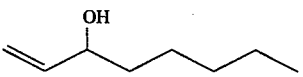

9. The process of claim 6 wherein the Crustacean-exciting material is methional having the structure:

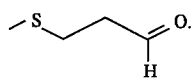

10. The process of claim 6 wherein the Crustacean-exciting material is trimethyl amine oxide hydrate having the structure:

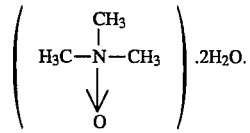

11. Apparatus for determining whether a given substance at a given aqueous concentration attracts or excites a member of the Penaeus genus of Crustacea comprising:

(a) static holding tank means containing a volume of water and for holding at least one live member of the Penaeus genus of Crustacea within said volume of water;

(b) pump-generated test solution feeding means for pumping aqueous solutions at variable or constant flow rates of test material into said static holding tank;

(c) visible light generating and guidance means for guiding visible wave length light of variable or constant intensity into said volume of water in said static holding tank;

(d) first variable power source means for engaging the visible light generating means;

(e) second variable power source means for engaging the pump generated feeding means; and (f) variable focus camera recording means for recording the movements of one or more portions and/or the lateral direction or velocity of one or more members of the Penaeus genus of Crustacea when the pump generated feeding means is engaged and when the visible light generating means is engaged whereby the camera recording means records the nature of the motion of the member of the Penaeus genus of Crustacea towards the substance fed by said pump generated feeding means into said holding tank.

12. Apparatus for determining whether a given substance at variable aqueous concentrations attracts or excites a member of the Penaeus genus of Crustacea comprising:

(a) a flow-through tank means containing a moving volume of water entering via an inlet and exiting via an exit orifice and for holding at least one live member of the Penaeus genus of Crustacea within said flow-through tank means;

(b) pump generated test solution feeding means for pumping aqueous solutions at variable or constant flow rates of test material into said flow-through holding tank ahead of said entry orifice;

(c) visible light generating and guiding means for guiding visible wave length light of variable or constant intensity into the inner part of said flow-through tank means;

(d) a first variable power source for engaging the visible light generating means;

(e) a second variable power source for engaging the pump generated feeding means; and (f) variable focus camera recording means for recording the movements of one or more portions and/or the lateral direction or velocity of the member of the Penaeus genus of Crustacea when the visible light generating means and the pump generated feeding means are engaged whereby the movements and/or lateral motion of the member of the Penaeus genus of Crustacea within the flow-through holding tank means is recorded indicating whether the given substance being fed into the flow-through holding tank means causes an excitory or attracting mechanism for said member of the Penaeus genus of Crustacea.

13. Apparatus for determining whether a given substance at a given aqeuous concentration attracts or excites a member of the Penaeus genus of Crustacea comprising:

(a) a "Y-maze" holding tank means comprising a first rectangular parallelepiped having one closed end and one open end, two sides each of which is sealably connected to said closed end and each of which terminates at the open end, a transparent top panel and a transparent bottom panel each of which is sealably connected to said two sides and said closed end; said open end of said first rectangular parallelepiped being connected to two diverging parallelepiped-shaped sections: a feeding section and a control section, said feeding section having an open end and a closed end and said control section having an open end and a closed end said open end of said feeding section being connected to said open end of said first rectangular parallelepiped and said open end of said control section being connected to said open end of said first rectangular parallelepiped, said feeding section and said control section being sealably connected at said point of divergents to said first rectangular parallelepiped, said holding tank means containing (i) a volume of water and for holding at least one live member of the Penaeus genus of Crustacea within said volume of water;

(b) pump generated test solution feeding means for pumping aqueous solutions at various flow rates or constant flow rates of nest material into said feeding section of said holding tank means;

(c) visible light generating and guidance means for guiding visible wave length light of variable or constant intensity into said volume of water in said static holding tank means;

(d) first variable power source means for engaging the visible light generating means;

(e) second variable power source means for engaging the pump generated feeding means;

(f) variable focus camera recording means having a line of sight directed through one of said transparent panels for recording the movements of one or more portions and/or the lateral direction or velocity of one or more members of the Penaeus genus of Crustacea when the visible light generating means and when the pump generated feeding means are each engaged whereby the variable focus camera recording means will record the motion of the Penaeus genus of Crustacea into said control section or said feeding section when test material is pumped into said feeding section.

\* \* \* \* \*

UNITED STATES PATENT AND TRADEMARK OFFICE
CERTIFICATE OF CORRECTION

PATENT NO. : 5,474,030
DATED : December 12, 1995
INVENTOR(S) : Alan O. Pittet; Phillip G. Lee; and Jennifer C. Ellis It is certified that error appears in the above-indentified patent and that said Letters Patent is hereby corrected as shown below:

Cover page, left hand column at Item [73], lines 8, 9 and 10, replace:

[73] Assignees: International Flavors & Fragrances Inc., New York, N.Y.; The University of Texas System, Austin, Tex.

with:

---[73] Assignees: International Flavors & Fragrances Inc., New York, N.Y.; Board of Regents, The University of Texas System, Austin, Tex. ---

Signed and Sealed this

Fourteenth Day of January, 1997

Attest:

BRUCE LEHMAN

*Attesting Officer*     *Commissioner of Patents and Trademarks*